(12) United States Patent
Zhang et al.

(10) Patent No.: US 9,460,478 B2
(45) Date of Patent: Oct. 4, 2016

(54) SYSTEM AND METHOD FOR WIND GENERATION FORECASTING

(71) Applicants: Junshan Zhang, Chandler, AZ (US); Miao He, Tempe, AZ (US); Lei Yang, Tempe, AZ (US); Vijay Vittal, Scottsdale, AZ (US)

(72) Inventors: Junshan Zhang, Chandler, AZ (US); Miao He, Tempe, AZ (US); Lei Yang, Tempe, AZ (US); Vijay Vittal, Scottsdale, AZ (US)

(73) Assignee: Arizona Board of Regents on behalf of Arizona State University, Scottsdale, AZ (US)

(*) Notice: Subject to any disclaimer, the term of this patent is extended or adjusted under 35 U.S.C. 154(b) by 376 days.

(21) Appl. No.: 14/109,586

(22) Filed: Dec. 17, 2013

(65) Prior Publication Data
US 2014/0172329 A1    Jun. 19, 2014

Related U.S. Application Data

(60) Provisional application No. 61/738,178, filed on Dec. 17, 2012.

(51) Int. Cl.
| | | |
|---|---|---|
| *G01R 21/00* | (2006.01) | |
| *G06Q 50/06* | (2012.01) | |
| *G06Q 10/04* | (2012.01) | |
| *H02J 3/38* | (2006.01) | |
| *H02J 3/00* | (2006.01) | |

(52) U.S. Cl.
CPC ............ *G06Q 50/06* (2013.01); *G06Q 10/04* (2013.01); *H02J 3/386* (2013.01); *H02J 2003/007* (2013.01); *Y02E 10/763* (2013.01); *Y02E 60/76* (2013.01); *Y04S 10/54* (2013.01); *Y04S 40/22* (2013.01)

(58) Field of Classification Search
CPC .. G06Q 30/0277; G06Q 20/10; G06Q 40/00; G06Q 40/025; G06Q 40/04; G06Q 40/06; G06Q 40/12; G06Q 50/188; G06F 3/012; G06F 3/013; G06F 3/167; G06T 11/206; G06T 2200/24; G06T 7/0012; G06T 17/20; G06T 2207/30024; G06T 2207/30096; G06T 2207/30048
See application file for complete search history.

(56) References Cited

U.S. PATENT DOCUMENTS

| | | | |
|---|---|---|---|
| 6,359,635 B1 * | 3/2002 | Perttunen | G06F 17/30994 707/E17.142 |
| 6,975,925 B1 | 12/2005 | Barnes et al. | |
| 7,023,205 B1 * | 4/2006 | Krupp | G01N 27/72 324/239 |

(Continued)

OTHER PUBLICATIONS

Ramon van Handel, Hidden Markov Models, Jul. 28, 2008.*

(Continued)

*Primary Examiner* — Roy Y Yi
(74) *Attorney, Agent, or Firm* — Snell & Wilmer L.L.P.

(57) ABSTRACT

Systems and methods for managing electricity of an electrical supply grid electrically connected to a wind farm are disclosed. Some systems and methods may include identifying relationships among a plurality of turbines in the wind farm with a minimum spanning tree, calculating a power output relationship among the plurality of turbines with the minimum spanning tree, creating a finite state space Markov chain forecast model for the plurality of turbines in the wind farm, predicting a power output of the wind farm with the finite state space Markov chain forecast model, and modifying at least one of a generation of electricity and a distribution of electricity based on the predicted power output of the wind farm. Also disclosed are systems and methods for predicting the power output of a wind farm.

16 Claims, 14 Drawing Sheets

(56) References Cited

U.S. PATENT DOCUMENTS

| | | |
|---|---|---|
| 8,200,435 B2 | 6/2012 | Stiesdal |
| 2003/0160457 A1* | 8/2003 | Ragwitz ............... F03D 7/043 290/44 |
| 2005/0168240 A1* | 8/2005 | Martin ................. H03M 7/30 326/46 |
| 2012/0046917 A1 | 2/2012 | Fang et al. |

OTHER PUBLICATIONS

H. Madsen, P. Pinson, G. Kariniotakis, H.A.Nielsen, and T. S.Nielsen, "Standardizing the performance evaluation of short-term wind power prediction models," Wind Engineering, vol. 29, No. 6, pp. 475-489, 2005.
L.Yang et al., "Stochastic Optimization Based Economic Dispatch and Interruptible Load Management with Distributional Forecast of Wind Farm Generation," 53rd IEEE Conference on Decision and Control, L.A., Cal., pp. 199-204, Dec. 15-17 (2014).
Ucilia Wang, "What Electric Grid Operators Want: Good Wind Energy Forecasts," Forbes (May 30, 2012) http://www.forbes.com/sites/uciliawang/2012/05/30/what-electric-grid-operators-want-good-wind-energy-forecasts/.
A. Carpinone et al., "Very Short-Term Probabilistic Wind Power Forecasting Based on Markov Chain Models," pp. 107-112, IEEE PMAPS 2010.
L. Yang, "Stochastic Optimization and Real-Time Scheduling in Cyber-Physical Systems", PhD thesis, Arizona State University, Dec. 2012.
R. Burrett, et al., "Renewables Global Status Report," Renewable Energy Policy Network for the 21st Century, 2009.
R.C. Prim, "Shortest Connection Networks and Some Generalizations," The Bell System Technical Journal, vol. 36, pp. 1389-1401, 1957.
E.S. Takle et al., "Note on the Use of Weibull Statistics to Characterize Wind-Speed Data," Journal of Applied Meteorology, vol. 17, pp. 556-559. 1978.
Qinqing Zhang et al., "Finite-State Markov Model for Rayleigh Fading Channels," IEEE Transactions on Communications, vol. 47, No. 11, pp. 1688-1692, 1999.
J.L. Torres et al., "Forecast of Hourly Average Wind Speed with ARMA Models in Navarre (Spain)," Solar Energy, vol. 79, No. 1, pp. 65-77, 2005.
Mej Newman, "Power Laws, Pareto Distributions and Zipf's Law," Contemporary Physics, vol. 46, No. 5, pp. 323-351, 2005.
M.S. Miranda et al., "One-Hour-Ahead Wind Speed Prediction Using a Bayesian Methodology," IEEE Power Engineering Society General Meeting, 2006.
C.W. Potter et al., "Very Short-Term Wind Forecasting for Tasmanian Power Generation," IEEE Transactions on Power Systems, vol. 21, No. 2, pp. 965-972, 2006.
K.S. Cory et al., "Renewable Portfolio Standards in the States: Balancing Goals and Implementation Strategies," National Renewable Energy Laboratory Technical Report, NREL/TP-670-41409, 2007.
G. Papaefthymiou et al., "MCMC for Wind Power Simulation," IEEE Transactions on Energy Conversion, vol. 23, No. 1, pp. 234-240, 2008.
M. He et al., "Multiple Timescale Dispatch and Scheduling for Stochastic Reliability in Smart Grids with Wind Generation Integration," IEEE Infocom 2011, pp. 461-465, 2011.
P.P. Varaiya et al., "Smart Operation of Smart Grid: Rick-Limiting Dispatch," Proceedings of the IEEE, vol. 99, No. 1, pp. 40-57, 2011.
S. Murugesan et al., "Finite State Markov Chain Model for Wind Generation Forecast: A Data-driven Spatiotemporal Approach," Innovative Smart Grid Technologies (ISGT), 2012 IEEE PES, 2012.
K.S. Cory and B.G. Swezey, "Renewable Portfolio Standards in the States: Balancing Goals and Implementation Strategies," NREL Technical Report TP-670-41409, Dec. 2007.
G. Kariniotakis, et al., "Advanced Short-term Forecasting of Wind Generation—Anemos," IEEE Transactions on Power Systems, 2006.
C. W. Potter and M. Negnevistsky, "Very Short-Term Wind Forecasting for Tasmanian Power Generation," 21 IEEE Transactions on Power Systems, vol. 21, No. 2, pp. 965-972, May 2006.
M. S. Miranda and R. W. Dunn, "One-hour-ahead Wind Speed Prediction Using a Bayesian Methodology," IEEE Power Engineering Society General Meeting, 2006.
M. He, S. Murugesan and J. Zhang, "Multiple Timescale Dispatch and Scheduling for Stochastic Reliability in Smart Grids with Wind Generation Integration," Proc. IEEE INFOCOM 2011 Mini-Conference, Shanghai, China, pp. 461-465, Apr. 2011.
P. P. Varaiya, F. F. Wu and J. W. Bialek, "Smart Operation of Smart Grid: Risk-Limiting Dispatch," Proceedings of the IEEE, vol. 99., No. 1, pp. 40-57, Jan. 2011.
S. Murugesan, J. Zhang and V. Vittal, "Finite State Markov Chain Model for Wind Generation Forecast: A Data-driven Spatio-temporal Approach," Innovative Smart Grid Technologies, 2012 IEEE PES, pp. 1-8, Jan. 2012.
N. Abdel-Karim, M. Small and M. Ilic, "Short Term Wind Speed Prediction by Finite and Infinite Impulse Response Filters: A State Space Model Representation Using Discrete Markov Process," IEEE Bucharest Power Tech Conference, Bucharest, 2009.
M. E. J. Newman, "Power Laws, Pareto Distributions and Zipfs Law," Contemporary Physics, vol. 46, No. 5, pp. 323-351, 2005.
R. C. Prim, "Shortest Connection Networks and Some Generalizations," The Bell System Technical Journal, vol. 36, pp. 1389-1401, Nov. 1957.
E. S. Takle and J. M. Brown, "Note on the Use of Weibull Statistics to Characterize Wind Speed Data," Journal of Applied Meteorology, 17, pp. 556-559, Apr. 1978.
Q. Zhang and S. A. Kassam, "Finite-state Markov Model for Rayleigh Fading Channels," IEEE Transactions on Communications, vol. 47, No. 11, pp. 1688-1692, Nov. 1999.
G. Papaefthymiou and B. Klockl, "MCMC for Wind Power Simulation," IEEE Transactions on Energy Conversion, vol. 23, No. 1, pp. 234-240, Mar. 2008.
M. He, et al., "A Spatio-temporal Analysis Approach for Short-Term Forecast of Wind Farm Generation", 29 IEEE Transactions on Power Systems, vol. 29, No. 4, pp. 1611-1622, Jul. 2014.
L. Xie, P. Carvalho, L. Ferreira, J. Liu, B. Krogh, N. Popli, and M. Ilic, "Wind Integration in Power Systems: Operational Challenges and Possible Solutions," Proceedings of the IEEE, vol. 99, No. 1, pp. 214-232, Jan. 2011.
D. Lew, M. Milligan, G. Jordan, and R. Piwko, "The Value of Wind Power Forecasting," NREL Conference Paper CP-5500-50814, Apr. 2011.
G. Giebel, R. Brownsword, G. Kariniotakis, M. Denhard, and C. Draxl, "The State of the Art in Short-Term Prediction of Wind Power—A Literature Overview, 2nd Edition," ANEMOS.plus/safewind, Jan. 2011, available at, http://www.anemos-plus.eu/images/pubs/deliverables/aplus.deliverable d1.2.stp sota v1.1.pdf.
C. Monteiro, H. Keko, R. Bessa, V. Miranda, A. Botterud, J. Wang, G. Conzelmann, and I. Porto, "A Quick Guide to Wind Power Forecasting: State-of-the-art 2009," Argonne National Laboratory, Nov. 2009, available at, http://www.dis.anl.gov/pubs/65614.pdf.
P. Pinson and H. Madsen, "Probabilistic Forecasting of Wind Power at the Minute Time-Scale with Markov-Switching Autoregressive Models," in Probabilistic Methods Applied to Power Systems, Proceedings of the 10th International Conference, pp. 1-8, May 2008.
P. Pinson and H. Madsen, "Adaptive Modelling and Forecasting of Offshore Wind Power Fluctuations with Markov-switching Autoregressive Models," Journal of Forecasting, vol. 31, No. 4, pp. 281-313, 2012.
T. S. Nielsen et al., "Short-term Wind Power Forecasting Using Advanced Statistical Methods," in Proceedings of European Wind Energy Conference, Athens, Greece, pp. 1-9, 2006.
J. Catalao, H. M. I. Pousinho, and V. Mendes, "Hybrid Wavelet-PSO-ANFIS Approach for Short-term Wind Power Forecasting in Portugal," Sustainable Energy, IEEE Transactions, vol. 2, No. 1, pp. 50-59, 2011.

(56) References Cited

OTHER PUBLICATIONS

P. Pinson and G Kariniotakis, "Wind Power Forecasting Using Fuzzy Neural Networks Enhanced with On-line Prediction Risk Assessment," in Power Tech Conference, 2003 IEEE Bologna, vol. 2, 2003.
J. Zeng and W. Qiao, "Support Vector Machine-based Short-term Wind Power Forecasting," in Power Systems Conference and Exposition, 2011 IEEE/PES, pp. 1-8, 2011.
S. Santoso, M. Negnevitsky, and N. Hatziargyriou, "Data Mining and Analysis Techniques in Wind Power System Applications: Abridged," in Power Engineering Society General Meeting, 2006. IEEE, pp. 1-3, 2006.
A. Kusiak, H. Zheng, and Z. Song, "Wind Farm Power Prediction: A Data-mining Approach," Wind Energy, vol. 12, No. 3, pp. 275-293, 2009.
H. Y. Zheng and A. Kusiak, "Prediction of Wind Farm Power Ramp Rates: A Data-mining Approach," ASME Journal of Solar Energy Engineering, vol. 131, pp. 031011-1-031011-8, Aug. 2009.
C. Potter, E. Grimit, and B. Nijssen, "Potential Benefits of a Dedicated Probabilistic Rapid Ramp Event Forecast Tool," in Power Systems Conference and Exposition, IEEE/PES, pp. 1-5, 2009.
H. Zareipour, D. Huang, and W. Rosehart, "Wind Power Ramp Events Classification and Forecasting: A Data Mining Approach," Power and Energy Society General Meeting, 2011 IEEE, pp. 1-3, 2011.
M. Lei, L. Shiyan, J. Chuanwen, L. Hongling, and Z. Yan, "A Review on the Forecasting of Wind Speed and Generated Power," Renewable and Sustainable Energy Reviews, vol. 13, No. 4, pp. 915-920, 2009.
C. Ferreira, J. Gama, L. Matias, A. Botterud, and J. Wang, "A Survey on Wind Power Ramp Forecasting." Argonne National Laboratory, Dec. 2010, available at http://www.dis.anl.gov/pubs/69166.pdf.
C. Kamath, "Understanding Wind Ramp Events through Analysis of Historical Data," Transmission and Distribution Conference and Exposition, IEEE PES, 2010.
Department of Communications, Energy and Natural Resources, "All Island Grid Study, Work Stream 4, Analysis of Impacts and Benefits." Available at http://www.dcenr.gov.ie/Energy/North-South+Co-operation+in+the+Energy+Sector/All+Island+Electricity+Grid+Study.htm, Jan. 2008.
"Wilmar (Wind Power Integration in Liberalised Electricity Markets)," Available at, http://www.wilmar.risoe.dk/index.htm, Mar. 2012.
L. Yang, et al., "Support Vector Machine Enhanced Markov Model for Short-term Wind Power Forecast," Chapter 3, pp. 35-57, Nov. 2014.
C. W. Hsu and C. J. Lin, "A Comparison of Methods for Multiclass Support Vector Machines," IEEE Transactions on Neural Networks, vol. 13, No. 2, pp. 415-425, Mar. 2002.
C. Hsu, C. Chang, and C. Lin, "A Practical Guide to Support Vector Classification," Department of Computer Science, National Taiwan University, Apr. 2010.
C. C. Chang and C. J. Lin, "LIBSVM: A Library for Support Vector Machines," ACM Transactions on Intelligent Systems and Technology, vol. 2, pp. 27:1-27:27, 2011. Software available at http://www.csie.ntu.edu.tw/cjlin/libsvm.
C. J. Burges, "A Tutorial on Support Vector Machines for Pattern Recognition," Data Mining and Knowledge Discovery, vol. 2, pp. 121-167, 1998.
E. A. DeMeo et al., "Accommodating Wind's Natural Behavior," IEEE Power Energy Magazine, vol. 5, pp. 59-67,Nov.-Dec. 2007.
S. Fink, C. Mudd, K. Porter, and B. Morgenstern, "Wind Energy Curtailment Case Studies," NREL Subcontract Report, Oct. 2009, Rep. SR-550-46716.
F. Cassola and M. Burlando, "Wind Speed and Wind Energy Forecast through Kalman Filtering of Numerical Weather Prediction Model Output," Applied Energy, vol. 99, pp. 154-166, 2012.
P. Pinson and G. Kariniotakis, "Conditional Prediction Intervals of Wind Power Generation," IEEE Transactions on Power Systems, vol. 25, No. 4, pp. 1845-1856, Nov. 2010.
NSF Initiative on "Core Techniques and Technologies for Advancing Big Data Science & Engineering (BIGDATA)," 2012, http://www.nsf.gov/pubs/2012/nsf12499/nsf12499.htm#toc.
A. Lau and P. McSharry, "Approaches for Multi-step Density Forecasts with Application to Aggregated Wind Power," Annals of Applied Statistics, vol. 4, No. 3, pp. 1311-1341, 2010.
P. Pinson, "Very Short-term Probabilistic Forecasting of Wind Power Time-series with Generalized Logit-normal Distributions," J. R. Statist. Soc.: Series C (Applied Statistics), vol. 61, No. 4, pp. 555-576, 2012.
M. He, L. Yang, J. Zhang, and V. Vittal, "Spatio-temporal Analysis for Smart Grids with Wind Generation Integration," International Conference on Computing, Networking and Communications, pp. 1107-1111, 2013.
P. Luh, Y.Yu, B. Zhang, E. Litvinov, T. Zheng, F. Zhao, J. Zhao, and C. Wang, "Grid Integration of Intermittent Wind Generation: A Markovian Approach," IEEE Transactions on Smart Grid, vol. 5, No. 2, pp. 732-741, Mar. 2014.
D. Kugiumtzis and E. Bora-Senta, "Gaussian Analysis of Non-Gaussian Time Series," Brussels Economic Review, vol. 53, No. 2, pp. 295-322, 2010.
NERC IVGTF Task 2.1 report, "Variable Generation Power Forecasting for Operations," May 2010, available at http://www.nerc.com/docs/pc/ivgtf/Task2-1(5.20).pdf.

\* cited by examiner

SYSTEM AND METHOD FOR WIND GENERATION FORECASTING

CROSS-REFERENCE TO RELATED APPLICATION

This application claims priority to, and the benefit of, U.S. Provisional Application Ser. No. 61/738,178 entitled "SYSTEM AND METHOD FOR WIND GENERATION FORECASTING" filed on Dec. 17, 2012, the contents of which are hereby incorporated herein by reference in their entirety.

FEDERALLY SPONSORED RESEARCH OR DEVELOPMENT

These inventions were made with government support under CPS-1035906 awarded by the National Science Foundation, and under grant number HDTRA 1-09-1-0032 awarded by the Defense Threat Reduction Agency. The government has certain rights in these inventions.

BACKGROUND

Existing techniques for wind farm generation forecasting are often based on wind speed forecast, which is subsequently translated into the wind power output, and generally assume that wind generation from the farm can be directly calculated as a function of wind speed recorded at one specific location in the farm. In reality, however, the relationship between wind speed observed at a location in the farm and the aggregate wind generation from the farm is far more complicated than a simple transformation based on the turbine power curve. In fact, the power outputs from identical turbines within a farm are not necessarily equal, even if the turbines are co-located, and this disparity or "mismatch" is particularly severe when they are far apart. Therefore, the applicability of the prior efforts is rather limited, particularly when the farm has a large number of turbines distributed over an extended geographical area. Another method for wind power forecast used in the power industry is based on persistent forecast, which assumes the wind generation remains the same in the epoch. However, such an approach would not work well in the event of wind ramps. Thus, there is an urgent need to develop a more systematic approach to both distributional forecast and point forecast of wind farm power generation. Principles of the present disclosure meet this need, taking a statistical-grounded approach based on historical data.

SUMMARY

Systems and methods disclosed herein may be useful in predicting the power output of a wind farm. In various embodiments, methods of managing electricity of an electrical supply grid electrically connected to a wind farm are provided comprising identifying relationships among a plurality of turbines in the wind farm with a minimum spanning tree, calculating a power output relationship among the plurality of turbines with the minimum spanning tree, creating a finite state space Markov chain forecast model for the plurality of turbines in the wind farm, predicting a power output of the wind farm with the finite state space Markov chain forecast model, and modifying at least one of a generation of electricity and a distribution of electricity based on the predicted power output of the wind farm.

Also disclosed are tangible, non-transitory computer readable mediums bearing instructions for predicting power output of a wind farm, the tangible, non-transitory memory having instructions stored thereon that, in response to execution by a processor, cause the processor to identify relationships among a wind turbine in the wind farm using a minimum spanning tree, calculate, using the minimum spanning tree, a power output relationship among the turbine, create a finite state space Markov chain forecast model, and predict, at a given wind speed at a location in the wind farm, the power output of the wind farm. In various embodiments, the instructions may cause the processor to modify at least one of a generation of electricity and a distribution of electricity on an electrical grid based on the predicted power output of the wind farm.

Systems disclosed herein may include systems for managing electricity of an electrical supply grid electrically connected to a wind farm comprising a processor configured to be in electrical communication with a wind farm power output sensor, wherein the processor is configured to identify relationships among a plurality of turbines in the wind farm with a minimum spanning tree, calculate a power output relationship among the plurality of turbines with a minimum spanning tree, create a finite state space Markov chain forecast model for the plurality of turbines in the wind farm, predict a power output of the wind farm with the finite state space Markov chain forecast model, and determine, based on the predicted power output of the wind farm, whether at least one of a generation of electricity and a distribution of electricity should be modified.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the drawing figures, wherein like numerals denote like elements.

DETAILED DESCRIPTION

Figure 1:
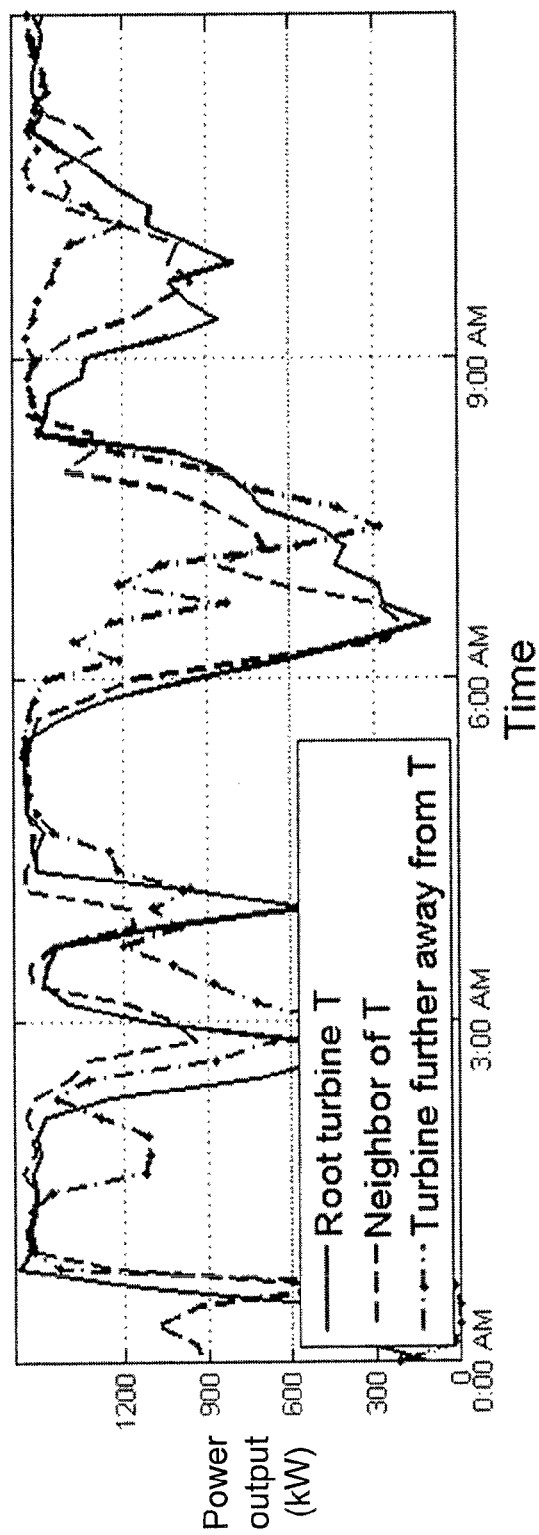
FIG. 1 illustrates imperfect spatial correlation between power output from turbines in a wind farm in accordance with an exemplary embodiment.

The following description is of various exemplary embodiments only, and is not intended to limit the scope, applicability or configuration of the present disclosure in any way. Rather, the following description is intended to provide a convenient illustration for implementing various embodiments including the best mode. As will become apparent, various changes may be made in the function and arrangement of the elements described in these embodiments without departing from the scope of the appended claims.

For the sake of brevity, conventional techniques for computer modeling, including spatial and/or temporal analysis, may not be described in detail herein. Furthermore, the connecting lines shown in various figures contained herein are intended to represent exemplary functional relationships and/or physical couplings between various elements. It should be noted that many alternative or additional functional relationships or physical connections may be present in various embodiments.

In accordance with principles of the present disclosure, models are developed to take into account both the spatial and temporal dynamics of power outputs from turbines within a wind farm, and to carry out spatio-temporal analysis of the farm aggregate wind generation. Using tools from graph theory, a rigorous step-by-step procedure to characterize the probability distribution of the aggregate wind generation from the farm may be carried out, while the diurnal non-stationarity and the seasonality of wind generation may be accounted for.

In various exemplary embodiments, as a first step towards modeling the correlation between the power outputs from the wind turbines, a "parent turbine" is identified for each turbine. As used herein, the term "parent turbine" may include a neighboring turbine, such as the closest turbine to the subject turbine (e.g., a nearest neighbor). Built on graph theory, a minimum spanning tree (MST) for each class of turbines in the farm is constructed. Linear regression over minimum spanning trees may be used to obtain an explicit relationship between the power outputs from any parent-child turbine pair, enabling a complete analytical characterization of the probability distribution of farm aggregate wind generation.

The temporal dynamics of the aggregate wind generation may be characterized using autoregression analysis. Built on these spatial and temporal characterizations, a finite state Markov chain for aggregate wind generation forecast may be derived in a rigorous optimization framework, through a careful design of Markov chain state space.

In contrast to prior approaches, which typically treat the power outputs from turbines within a farm as equal, principles of the present disclosure may contemplate taking into account spatial variation across turbines in a wind farm, and, in various embodiments, may devise a graph-learning based model to quantify the correlation structure across turbine outputs. Moreover, in contrast to prior approaches, which typically utilize a persistent prediction model (which forecast the wind speed to be the same); various embodiments of the present disclosure may contemplate developing a finite-state Markov model to effectively handle temporal variation. In this manner, disclosed systems and methods may significantly improve forecast accuracy of wind farm generation and/or management of electricity of an electrical grid. As used herein, the term "predict" and "forecast" and variations thereof may be used interchangeably.

In accordance with principles of the present disclosure, a central issue in meeting renewable portfolio standards (RPS) adopted by many states in the U.S. is the integration of renewable energy sources, such as wind and solar. Efficient integration of wind energy in power grids may be challenging due to the variability of wind energy, which may made more severe by wind energy's non-dispatchability. This uncertainty of wind energy impacts various system level considerations, such as the reliability and operational planning of power grids. Mischaracterizing these uncertainties may lead to significant spilling of the renewable generation. Accurate wind generation forecast models are therefore highly desirable in efficient integration of wind generation in power grids. This may be particularly true in the context of smart grid technologies, where wind integration should seamlessly coexist with sophisticated paradigms, such as consumer demand response and variable pricing.

A vast amount of existing literature on wind generation forecast focuses on wind speed forecast, which may be subsequently translated into the wind power output. It is assumed in some literature that wind generation from the farm can be directly calculated as a function of wind speed recorded at one specific location in the farm. However, the relationship between wind speed observed at a location in the farm and the aggregate wind generation from the farm may far more complicated than a simple transformation based on the turbine power curve. For example, as illustrated herein, the power outputs from identical turbines within a farm may not be equal, even if the turbines are co-located. This "mismatch" may be particularly severe when turbines are far apart. Therefore, the applicability of prior efforts may be rather limited when the farm has a large number of turbines distributed over an extended geographical area. Thus, there is an urgent need to develop a more systematic approach to directly forecast the farm aggregate wind generation, for example taking into consideration the spatial dynamics.

In prior efforts, when the primary purpose of the analysis is the stochastic characterization of the forecast variable conditioned on the current observations, then regression based forecast models prevalent in the literature would result in large computational burden. In contrast, for analysis related to the operation horizon, the primary interest lies in the "point forecast" of the wind farm output. However, a stochastic characterization (e.g., the probability density function) of the forecasted variable, conditioned on the current observation, may play a more critical role in optimization of power scheduling and dispatch in power grids. The impact of such a holistic forecast may be particularly high in applications such as stochastic scheduling and dispatch with demand response. Another such application may be risk limiting dispatch. However, regression-based forecast models, along with the forecast error characterization, may suffer from dimensionality and hence may suffer computational complexity issues. In this context, finite state Markov chain based forecast models may offer an improved platform to strike a balance between simplicity and rigor.

Figure 11:
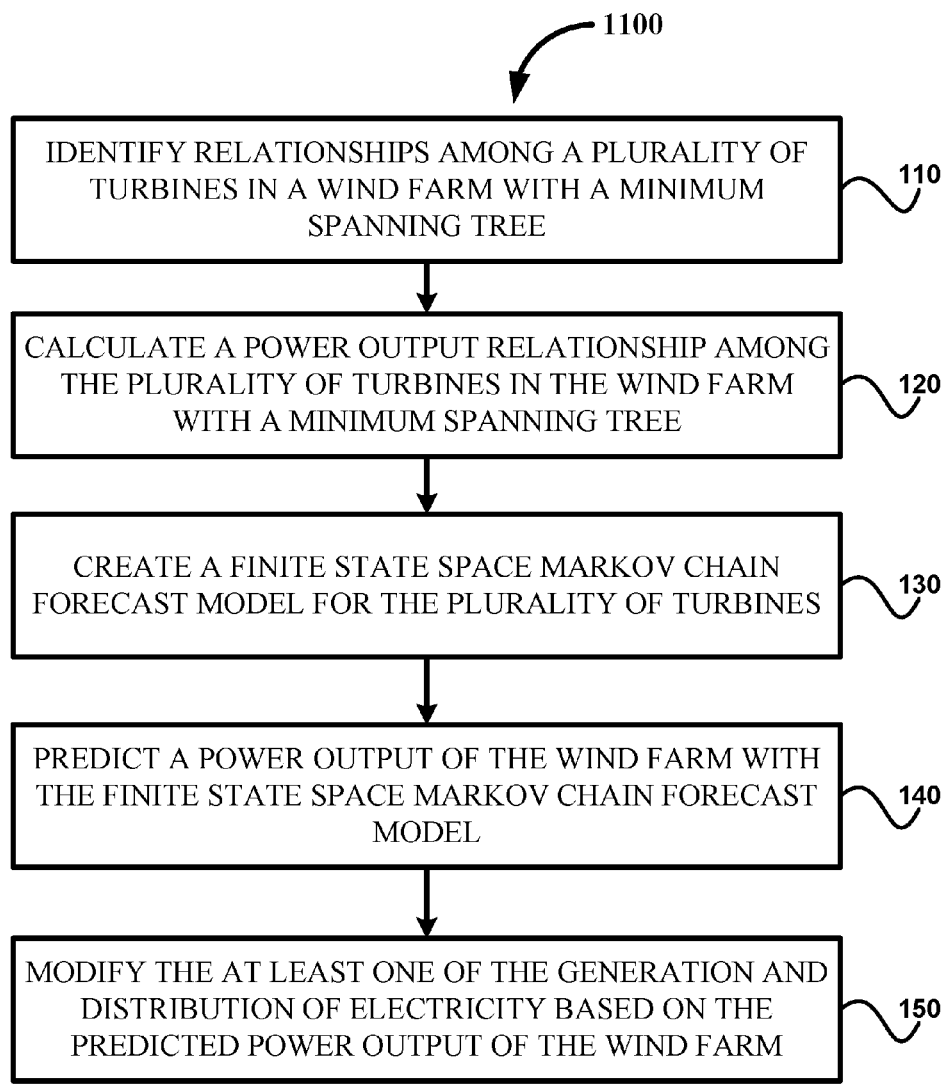
FIG. 11 illustrates a method for managing the distribution of electricity according to various embodiments.

With temporary reference to FIG. 11, principles of the present disclosure contemplate method 1100 for managing the distribution of electricity according to various embodiments. Method 1100 may comprise identifying relationships among a plurality of turbines in the wind farm with a minimum spanning tree (step 110). According to various embodiments, method 1100 may also comprise calculating a power output relationship among the plurality of turbines with the minimum spanning tree (step 120). Various embodiments may also include creating a finite state space Markov chain forecast model for the plurality of turbines in the wind farm (step 130). As described above, step 130 may utilize ramp trend information according to various embodiments. According to various embodiments step 130 may utilize historical data, for example comprising at least one of a historic data of wind turbine power output and a historic data of wind speed.

Method 1100 may also include predicting a power output of the wind farm with the finite state space Markov chain forecast model (step 140) according to various embodiments. According to various embodiments, method 1100 may also include modifying at least one of a generation of electricity and a distribution of electricity based on the predicted power output of the wind farm (step 150).

According to various embodiments, the minimum spanning tree may separate the plurality of wind turbines into a class, identify a parent turbine for each turbine within the class, and ensure that each turbine in the class is linked to a root turbine of the class.

According to various embodiments, method 1100 may further comprise forming a probability distribution of aggregate power generation of the wind farm. In various embodiments, the real-time wind farm electricity generation may be measured.

In various embodiments, the prediction of a power output of the wind farm may comprise at least one of a distributional forecast and a point forecast. According to various embodiments, the predicted power output of the wind farm may be predicted for a period about one hour into the future. In other exemplary embodiments, the predicted power output of the wind farm may be predicted for a period about one hour into the future, about 30 minutes into the future, about 10 minutes into the future, about 5 minutes into the future, and/or any other suitable length of time into the future.

As described herein, according to various embodiments, a plurality of finite state space Markov chains are created for an epoch. For example, a finite state space Markov chain may be created for each epoch in one day. According to various embodiments, a finite state space Markov chain may be created for each month in a year.

Figure 5:
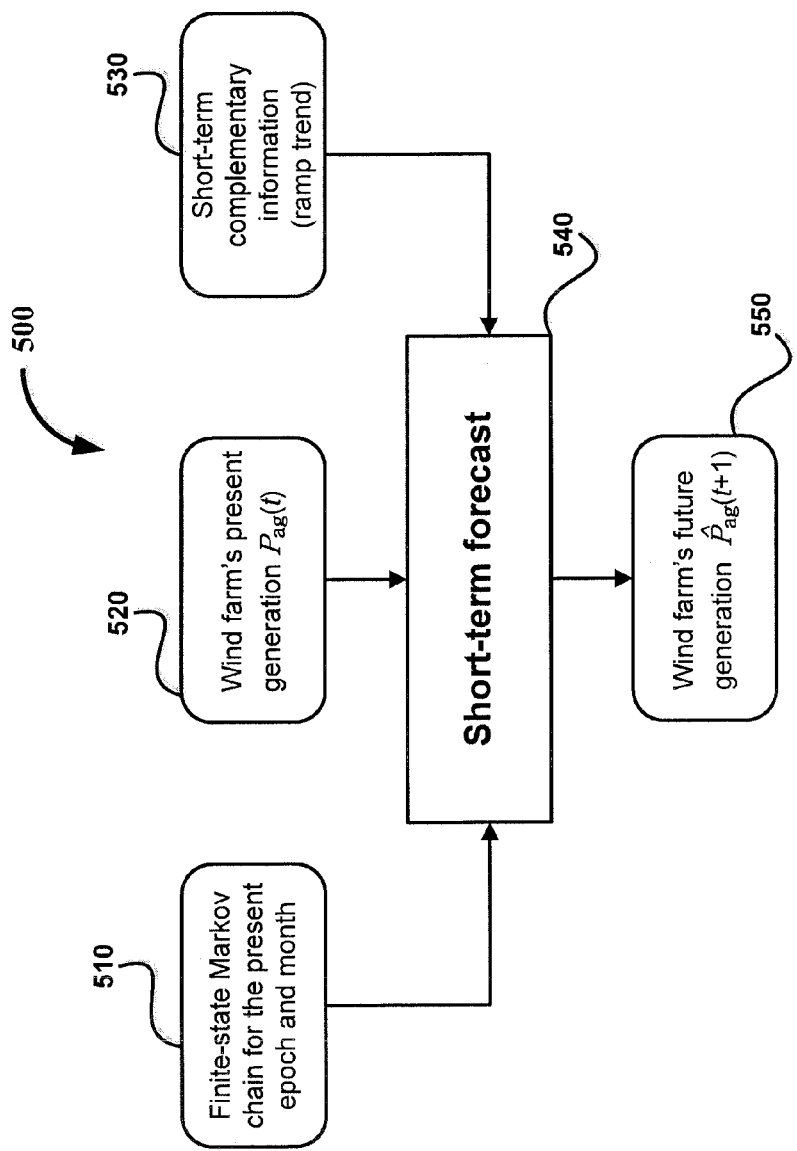
FIG. 5 illustrates an online short-term forecast according to various embodiments.

With reference to FIG. 5, FIG. 5 illustrates an online short-term forecast according to various embodiments. Online short-term forecast 500 may include various inputs for determining the wind farm's future power generation 550. According to various embodiments, inputs for online short-term forecast 500 may include at least one of the finite-state Markov chain for the present epoch and month 510, the wind farm's present power generation 520, and the short-term complementary information 530 (e.g., ramp trend). This data may be used to provide short-term forecast 540, which may be used to predict the wind farm's future power generation 550. According to various embodiments, in online forecasting, Markov chains may be applied to the real-time measurement of wind farm generation to provide both distributional forecasts and point forecasts. Specifically, the transition probabilities of Markov chains may help to determine the conditional probability distribution of future wind power (e.g., the probability distribution) conditioned on the real-time wind power measurement.

Figure 12:
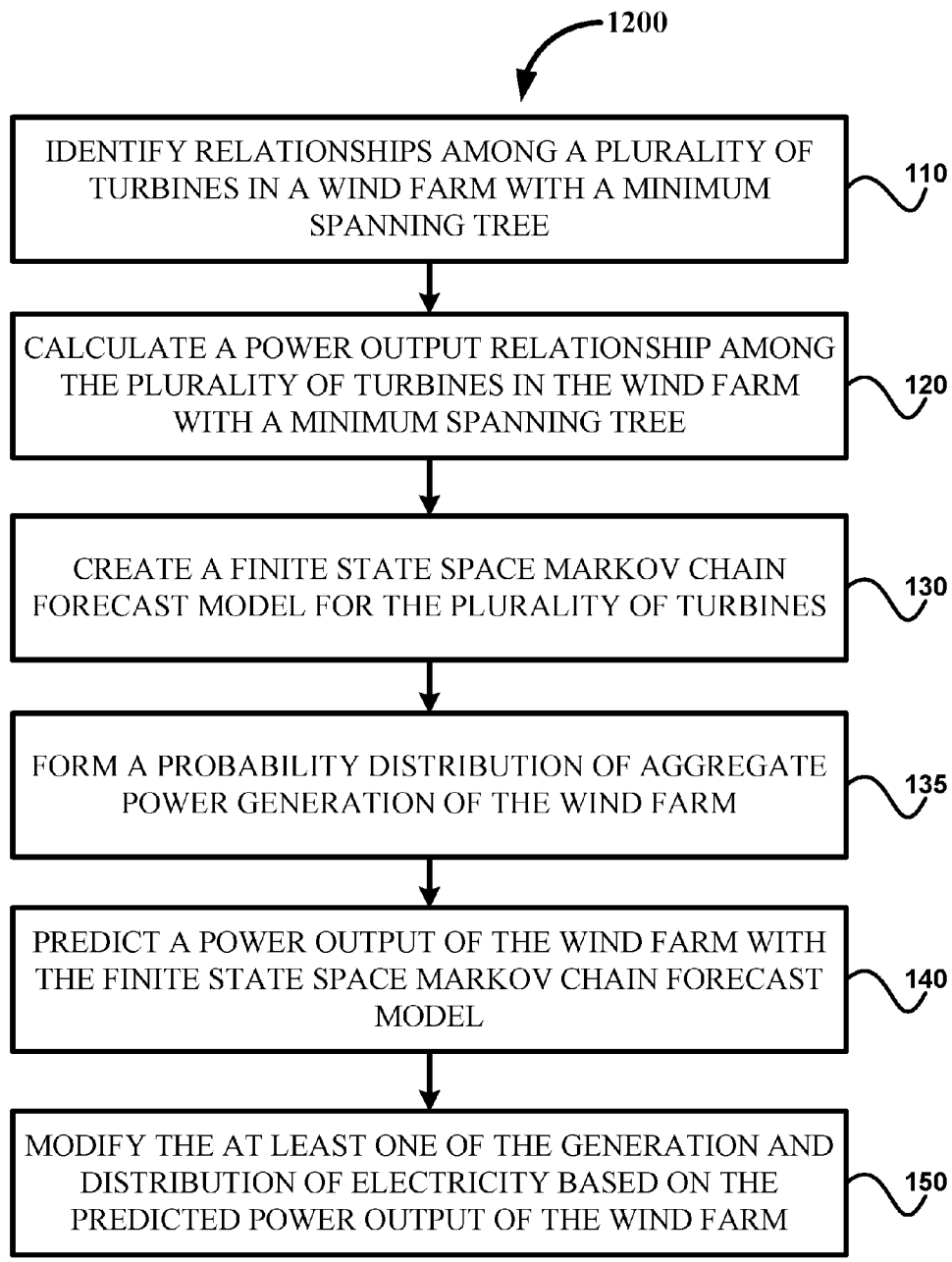
FIG. 12 illustrates a method for managing the distribution of electricity according to various embodiments.

With reference to FIG. 12, FIG. 12 also illustrates a method 1200 for managing the distribution of electricity according to various embodiments. Method 1200 may comprise identifying relationships among a plurality of turbines in the wind farm with a minimum spanning tree (step 110). According to various embodiments, method 1200 may also comprise calculating a power output relationship among the plurality of turbines with the minimum spanning tree (step 120). Various embodiments may also include creating a finite state space Markov chain forecast model for the plurality of turbines in the wind farm (step 130). According to various embodiments, method 1200 may comprise forming a probability distribution of aggregate power generation of the wind farm (step 135). Method 1200 may also include predicting a power output of the wind farm with the finite state space Markov chain forecast model (step 140) according to various embodiments. According to various embodiments, method 1200 may also include modifying at least one of a generation of electricity and a distribution of electricity based on the predicted power output of the wind farm (step 150).

Figure 13:
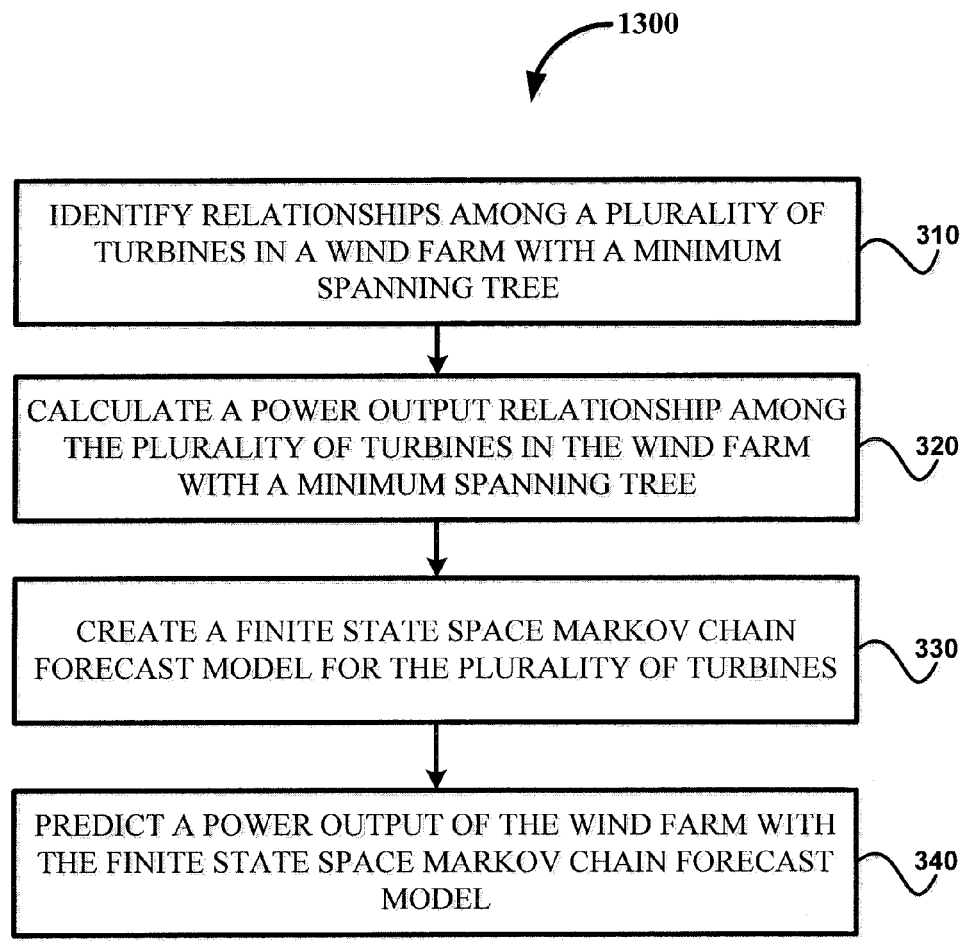
FIG. 13 illustrates a method for predicting the power output of a wind farm by a processor according to various embodiments.

With reference to FIG. 13, FIG. 13 illustrates a method for predicting power output of a wind farm, for example, by a processor. Method 1300 may comprise identifying relationships among wind turbines in the wind farm using a minimum spanning tree (step 310). Method 1300 may also comprise calculating, using the minimum spanning tree, a power output relationships among the turbines (step 320). According to various embodiments, method 1300 may comprise creating a finite state space Markov chain forecast model (step 330). Method 1300, according to various embodiments, may comprise predicting, at a given wind speed at a location in the wind farm, the power output of the wind farm (step 340).

In accordance with principles of the present disclosure, finite state Markov chain models may be developed to characterize the spatio-temporal dynamics of wind generation. In connection with these principles, a data-driven study of the temporal dynamics of wind speed may be used to develop a uniform state space Markov chain model for wind speed.

The present disclosure addresses the above mentioned limitations by developing a Markovian model for wind generation forecast. According to various embodiments, disclosed models consider both the spatial and temporal dynamics of power outputs from turbines within the farm. Using extensive data from a wind farm in the western USA, a spatio-temporal analysis of the aggregate wind generation from the farm was performed. It was observed from actual measurement data that the power outputs from the turbines are often not equal. Motivated by this observation and using tools from graph theory, a rigorous step-by-step procedure to characterize the probability distribution of the aggregate wind generation from the farm was undertaken, while the diurnal non-stationarity and the seasonality of wind generation are taken into account.

Various embodiments contained within the present disclosure are amenable to the case when the farm has turbines from multiple classes, (e.g., when they belong to multiple manufacturers, when they are different models, and/or when they are deployed with different hub heights). Temporal dynamics of aggregate wind generation may be characterized in a suitable manner, for example using auto-regression analysis. Built on these spatial and temporal characterizations, a finite state Markov chain for aggregate wind generation forecast may be derived in a rigorous optimization framework according to various embodiments.

Principles of the present disclosure contemplate that the tail probability of aggregate wind generation may exhibit power-law decay with an exponential cut-off and that the power-law part may have a much heavier tail than Gaussian distribution.

The basic notation used in the present disclosure is now introduced below. As used herein, $\mathcal{F}$ may denote the collection of wind turbines in the wind farm, where each wind turbine $i \in \mathcal{F}$ belongs to one of M (M≥1) classes $C_1 \ldots C_M$. As used herein, $N_m$ may denote the number of turbines within class $C_m$. As used herein, the power output of turbine i at time t may be given by $P_i(t)$. As used herein, $P_{ag,m}(t)$ may denote the aggregate wind generation from the turbines belonging to class $C_m$, at time t. Thus, $P_{ag,m}(t) = \Sigma_{i \in C_m} P_i(t)$. As used herein, $P_{ag}(t)$ may denote the aggregate wind generation from the entire wind farm at time t. Thus, $P_{ag}(t) = \Sigma_{m=1}^{M} P_{ag,m}(t)$.

According to various embodiments, for each class $C_m$ of wind turbines, there may be a meteorological (MET) tower $H_m$ such that it is co-located with one turbine from the class, which according to various embodiments, may be understood as a root turbine of the class, which may be denoted by $r_m$. As used herein, $W_m(t)$ may denote the wind speed observed at MET tower $H_m$ at time t. As used herein, $h_m$ may denote the height at which this observation is made on MET tower $H_m$. In various embodiments, $h_m$ may be the same as the hub height as one of the turbines in class $C_m$.

In the present disclosure, exemplary data obtained from a wind farm in the western USA is utilized and exemplified. However, it may be appreciated by a person of ordinary skill in the art that various principles contained within the present disclosure may applicable to any wind farm. In a given example, the exemplary farm has two turbine classes, i.e., M=2 with $N_1$=53 and $N_2$=221. The hub heights are given by $h_1$=80 m and $h_2$=69 m. The following 10-minute measurement data for each day of year 2009 and 2010 is available: $P_i(t), \forall i \in \mathcal{F}, W_1(t), W_2(t)$. For this exemplary data, there are several key observations as follows.

Spatial Dynamics of Wind Farm

With reference to FIG. 1, the power output from the root turbine of class $C_1$ may be compared with the power output from its nearest neighbor and that from a turbine further away, all of the same class. Despite the geographic proximity of the root and its nearest neighbor, the power outputs are not equal. The disparity or mismatch may be particularly severe with the turbine located further away, an observation that has been traditionally ignored in prior approaches.

Although the variable power outputs from turbines are not identical, principles of the present disclosure contemplate that they may follow a similar probability distribution, for example if the turbines are of the same class.

Diurnal Non-Stationarity and Seasonality

Wind speed may be seasonal and, thus, wind generation may also be seasonal. According to various embodiments, seasonality is accounted for by designing the forecast model for various periods of time (e.g., for each month of the year). As used herein, the term "month" may include a period of time between the same dates in successive calendar months. For example, a month may include any of the twelve months of the Gregorian calendar. Month may include any month, for example commonly lunar or lunisolar calendars, and is not particularly limited to one specific calendar.

According to various embodiments, diurnal non-stationarity may be accounted for by identifying an epoch. As used herein, the term "epoch" may include a length of time T, such that the wind generation exhibits approximately stationarity behavior within every T slots, and designing a forecast model for each of these T-length slots separately. For example, according to various embodiments, an epoch may last three hours (i.e., T=3 hours), however, any suitable length of time T may be utilized and the disclosure is not particularly limited to any length of time T.

In accordance with principles of the present disclosure, data-driven analysis which incorporates both the spatial and temporal dynamics of the wind farm aggregate wind generation may be performed. For example, exemplary data for a first year, for example the year 2009, may be used by the disclosed spatio-temporal analysis to guide the design of Markov chain models. Exemplary data for a subsequent year, for example the year 2010, may be used to test the forecast provided by the Markov chain.

Figure 4:
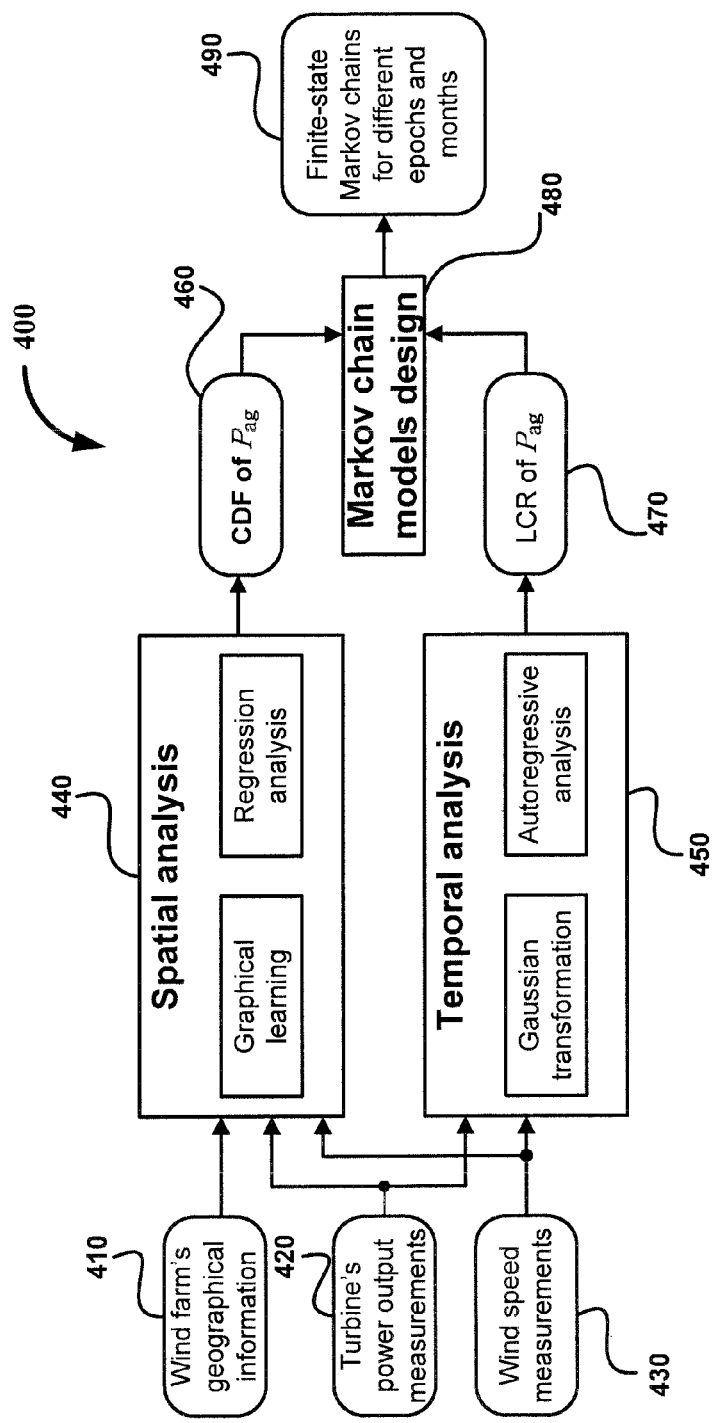
FIG. 4 illustrates an offline spatio-temporal analysis according to various embodiments.

With temporary reference to FIG. 4, FIG. 4 illustrates an offline spatio-temporal analysis according to various embodiments. Offline spatio-temporal analysis 400 may utilize the wind farm's geographical information 410, the turbine's power output measurements 420, and wind speed measurements 430. Other suitable information may also be utilized by offline spatio-temporal analysis 400. Wind farm's geographical information 410, turbine's power output measurements 420, and wind speed measurements 430 are used to perform spatial analysis 440, where graphical learning and regression analysis are performed. Then the cumulative density function of aggregate power output 460 is determined. Turbine's power output measurements 420 and wind speed measurements 430 are used to perform the temporal analysis 450, where Gaussian transformation and autoregressive analysis are performed. Then the level crossing rate of aggregate power 470 is determined. Both cumulative density function of aggregate power output 460 and level crossing rate of aggregate power 470 are utilized in Markov chain models design 480, resulting in finite-state Markov chains 490. In various embodiments, finite-state Markov chains 490 may be established for different epochs and months.

Spatial Analysis of Aggregate Wind Generation

Identifying Neighbors Using Minimum Spanning Trees

According to various embodiments, a parent turbine may be identified for each turbine. Using graph theory, a minimum spanning tree (MST) for each class of turbines in the farm may be constructed according to various embodiments. According to various embodiments, an MST may aid in identifying the parent turbine to each turbine within the considered class. According to various embodiments, an MST may help guarantee that each turbine in class $C_m$ is linked to a root turbine $r_m$ of that class.

Figure 2:
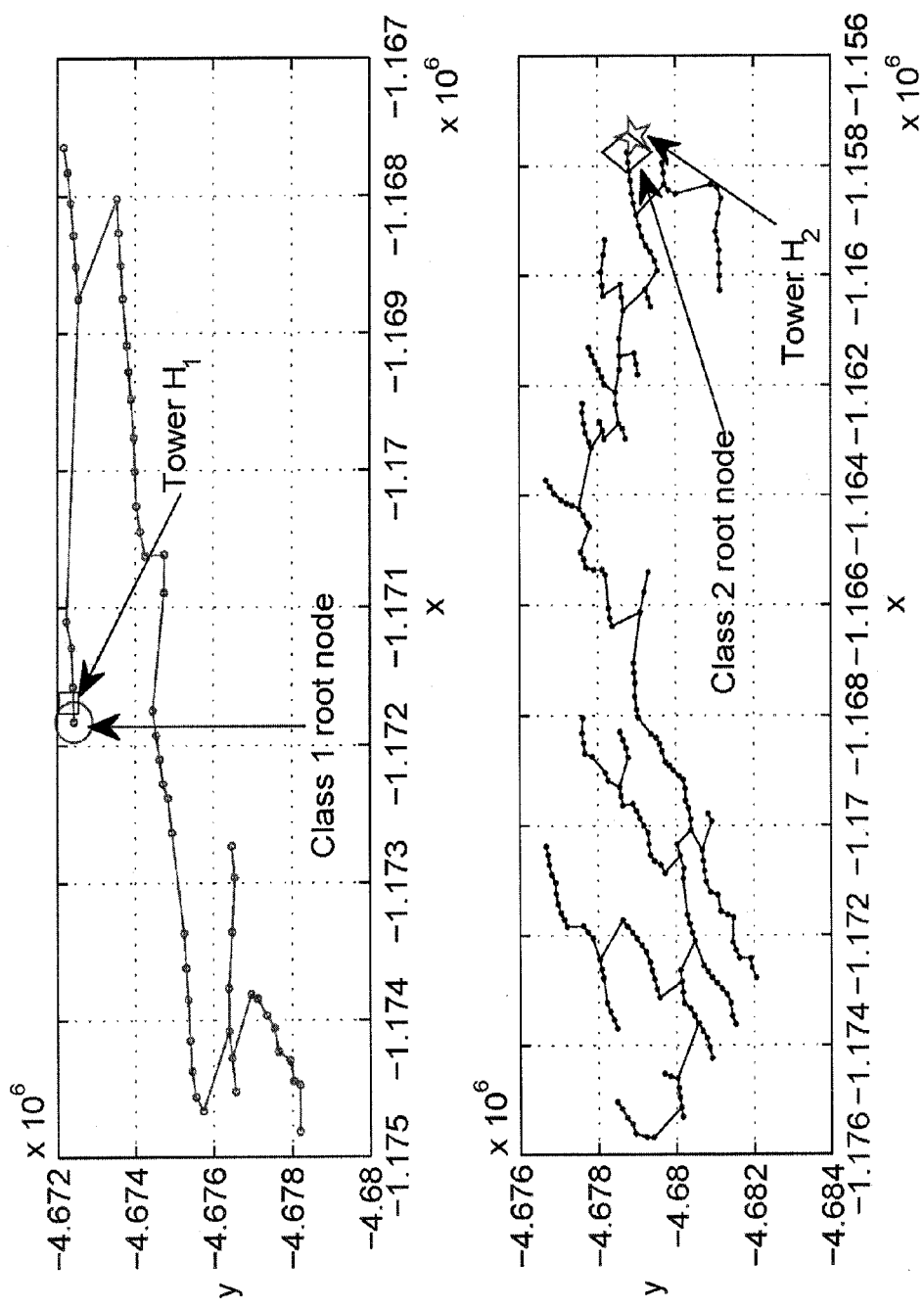
FIG. 2 illustrates minimum spanning trees for turbines in an exemplary wind farm in accordance with an exemplary embodiment.

However, identifying a parent turbine and guaranteeing that each turbine in class $C_m$ is linked to a root turbine $r_m$ of that class may conflict. For example, it may be possible that there exists a pair of turbines such that each one is its own nearest neighbor, essentially creating a group disconnected from the root turbine. The MST, by definition, achieves a balance between these potentially conflicting objectives by compromising on the notion of the nearest neighbor. With reference to FIG. 2, FIG. 2 illustrates an MST for each class of the exemplary data. Using data, the geographical information of wind turbines and MET towers, an MST for each class $C_m$ is constructed using Prim's algorithm and plotted in FIG. 2. MSTs may be constructed using any suitable algorithm.

In accordance with various embodiments, based on the MST obtained, the parent turbine of turbine i may be denoted by v(i). Recall that $r_m$ indicates the root turbine of class $C_m$. As used herein, $v^k(\cdot)$ may denote the $v(\cdot)$ operator repeated k times, e.g., $v^2(\bullet)=v(v(\bullet))$. According to various embodiments, an MST may be constructed, such that for any turbine $i \in C_m$, $\exists d_i \in \{1, 2, 3 \ldots \}$, $v^{d_i}(i)=r_m$. Thus, according to various embodiments, quantity $d_i$ may be the "distance" of turbine i from the root turbine $r_m$, along the MST. Thus, in various embodiments, the distance of root turbine, $d_{r_m}=0$, which is discussed in further detail below:

Linear Regression Over Minimum Spanning Trees

Considering a specific time instant, the spatial correlation between the individual wind turbines may be modeled according to various embodiments. Because the parent turbine v(i) for each turbine i in each class is identified in an MST, in various embodiments, an explicit relationship between the power outputs from any parent-child turbine pair may be obtained. This relation, along with the knowledge that all the turbines may be rooted in the root turbine for that class, may be used to express the aggregate wind generation from that class as a function of the power output from the root turbine. In various embodiments, by viewing the individual turbine output as a spatial stochastic process, it may be assumed that the explicit relationship is homogenous throughout each class. As used herein $G_{pc,m}(\bullet)$ may denote this homogenous parent-child relationship. Thus, in various embodiments, for any child turbine $i \in C_m$, with $\hat{P}_i$ denoting the predicted value of $P_i$ from the power output of parent turbine v(i), $\hat{P}_i(t) = G_{pc,m}(P_{v(i)}(t))$.

Using historical data sets, a scatter-plot may be used to determine the type of model (e.g., a simple linear (affine) model or other suitable model) which may be used to characterize the power outputs of parent-child turbine pairs in each class. For example, the exemplary data set and a scatter-plot of the power outputs of parent-child turbine pairs in class $C_1$, between 9-12 noon for all days in January 2009, a simple linear (affine) model may be chosen to characterize the power outputs of parent-child turbine pairs. Thus for any turbine i, the relation may be modeled as below:

$$\hat{P}_i(t) = a_m * P_{v(i)}(t) \quad (1)$$

The affine parameter $a_{m*}$ may be chosen to minimize the empirical mean square error between the aggregate power outputs of turbine class m and its estimate, given by:

$$a_m^* = \arg\min_{a_m} \frac{1}{N_t} \sum_t \left(P_{ag,m}(t) - \hat{P}_{ag,m}(t)\right)^2 = \quad (2)$$

$$\arg\min_{a_m} \frac{1}{N_t} \sum_t \left(\sum_{i \in C_m} (P_i(t) - P_{r_m}(t)(a_m)^{d_i})\right)^2$$

where the structure of the MST and the definition of distance $d_i$ are used in the second equality, and the quantity $N_t$ denotes the sample size. For convenience, define $\eta_m = \sum_{i \in C_m}(a_{m*})^{d_i}$, and then using the linear regression model, the aggregate wind generation of class $C_m$ is given by $\hat{P}_{ag,m}(t) = \eta_m P_{r_m}(t)$.

In various exemplary embodiments, the homogeneous linear regression coefficient for each parent-child turbine pair may be motivated by the observation from a scatter plot. In various embodiments, the above regression analysis may be generalized by applying regression analysis, so that each parent-child turbine pair can have a different linear regression coefficient. In various embodiments, each parent-child turbine pair can be analyzed by using different regression models. Exemplary regression models include linear regression models, exponential regression models, quadratic regression models, and/or any other type of suitable regression model.

Probability Distribution of Aggregate Wind Generation

In various embodiments, an analytical characterization of the probability distribution of farm aggregate wind generation may be obtained via the following steps:

Identify a reference MET tower $H_{m*} \in (H_1, \ldots, H_M)$, and express the wind speed $W_m$ observed from MET towers $H_m$, $m \in \{1, \ldots, M\}$, in terms of $W_{m*}$, the wind speed observed at the reference MET tower. Denote this function as $J_m(\bullet)$ for each MET tower m (particularly, $J_{m*}(\bullet)$ is the identity map). Thus, $\hat{W}_m = J_m(W_{m*})$.

Analytically characterize the CDF of the wind speed $W_{m*}$ at the reference MET tower, denoted by $F_{W_{m*}}(\bullet)$.

Using the power curves for the turbines in each class m, denoted by $U_m(\bullet)$, express the estimate of the farm aggregate power in terms of the wind speed $W_{m*}$ as follows:

$$\hat{P}_{ag} = \sum_m \hat{P}_{ag,m} \quad (3)$$

$$= \sum_m \eta_m \hat{P}_{r_m}$$

$$= \sum_m \eta_m U_m(J_m(W_{m*}))$$

$$\stackrel{\Delta}{=} G_{pw}(W_{m*})$$

Figure 3:
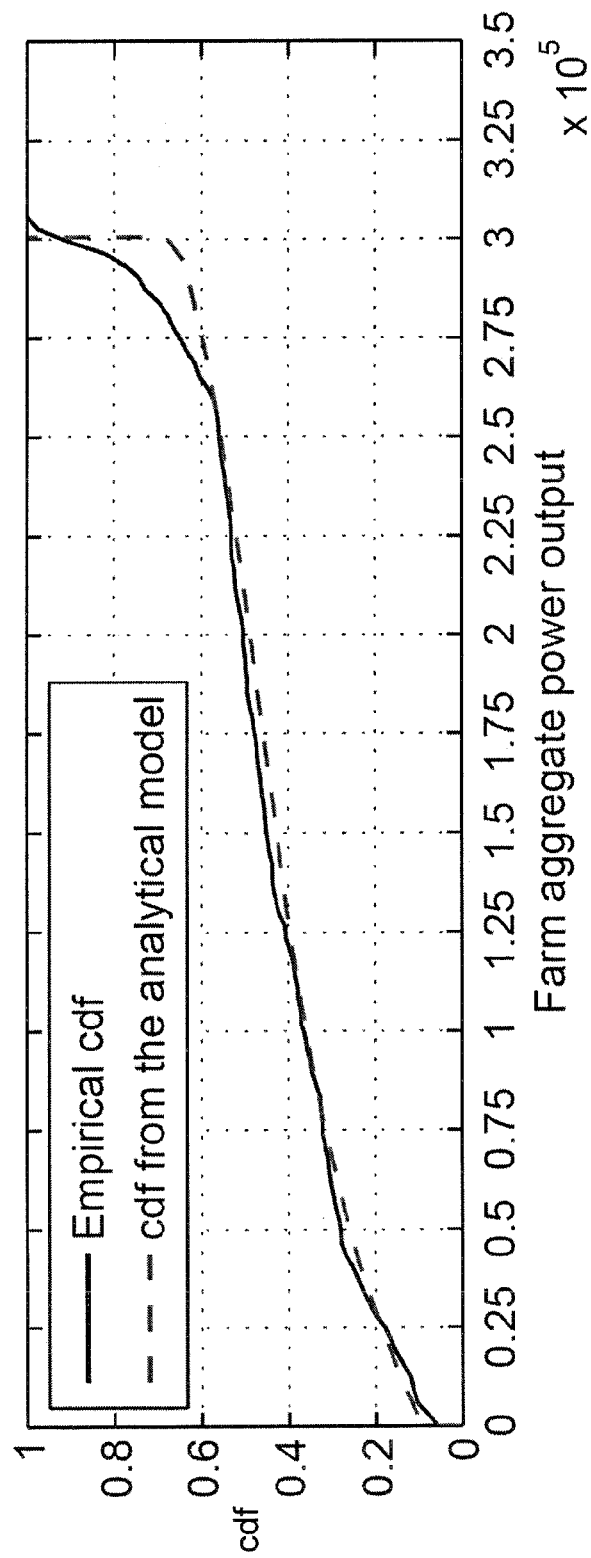
FIG. 3 illustrates a graph of measured vs. modeled wind farm power output in accordance with an exemplary embodiment.

With reference to FIG. 3, FIG. 3 illustrates an exemplary plot of the analytical CDF and empirical CDF of the aggregate power output of a wind farm. Using the analytical CDF of the reference MET tower wind speed, $F_{W_{m*}}(\bullet)$, analytically characterize the CDF of the farm aggregate power outputs as:

$$F_{P_{ag}}(p_{ag}) = F_{W_{m*}}(G_{pw}^{-1}(p_{ag})) \quad (4)$$

In an exemplary embodiment using an exemplary data set, the above four steps may be carried out in order. For example, the MET tower $H_1$ in class $C_1$ is chosen as the reference MET tower, i.e., m*=1. Using the exemplary data set, a simple linear (affine) model may be suitable to capture the relationship between these wind speeds. Accordingly, the model $\hat{W}_m = J_m(W_1) = \beta_{m*} W_1$ may be adopted, where $\beta^*_1 = 1$ and $\beta^*_2$ is chosen to minimize the mean square error between $W_2$ and $\hat{W}_2$, as follows:

$$\beta_2^* = \arg\min_{\beta_2} \frac{1}{N_t} \sum_t (W_2(t) - \beta_2 W_1(t))^2 \quad (5)$$

In accordance with various embodiments, wind speed can be modeled well using a Weibull distribution. A Weibull distribution may be fitted to the wind speed at the reference MET tower. The distribution fit can be guided by various choices of objective functions. In various embodiments, a maximum likelihood (ML) distribution fit may be performed using standard procedures. A plot comparing the Weibull distribution fit with the empirical CDF of wind speed, for a considered 9-12 noon slot in January is exemplified in FIG. 3. Accordingly, having analytically characterized the CDF of the wind speed at the reference MET tower, using (4) and $G_{pw}(\bullet)$ defined in (3), the analytical CDF of the farm aggregate power may be characterized.

In various exemplary embodiments, the farm aggregate power may be expressed as a function of the wind speed observed at one location. However, the relationship $G_{pw}(\bullet)$ rigorously takes into account the spatial dynamics inherent in the wind farm, resulting in improved forecasting accuracy. In contrast, prior approaches generally use a simple transformation from wind speed to wind generation based on turbine's power curve, resulting in reduced forecast accuracy.

Temporal Analysis and Level Crossing Rate Determination

According to various embodiments, viewing the farm aggregate power $P_{ag}(t)$ as a stochastic process, the level crossing rate, $\mathcal{N}(\Gamma)$, for any value of the farm aggregate power $\Gamma$ ($\Gamma \geq 0$), may be defined as the average number of times per unit time, that the farm aggregate power process crosses F in only the positive direction (from below $\Gamma$ to above $\Gamma$) or in the negative direction. In various embodiments, the level crossing (LC) rate of $P_{ag}(t)$ may be quantified by obtaining an auto-regressive model for this process and derive $\mathcal{N}(\Gamma)$ based on this model. In various embodiments, in order to develop a standard auto-regressive model with white Gaussian residue, $P_{ag}(t)$ may be transformed to a Gaussian random variable. The Gaussian transformation of a random variable X with CDF $F_X(\bullet)$ may be accomplished as $X^{N(0,1)} = G_{N(0,1)}^{-1} = F_X(\bullet))$, where N(0,1) is the standard normal distribution and $F_{N(0,1)}(\bullet)$ is the corresponding CDF in various embodiments.

In an exemplary embodiment using exemplary data, the CDF $F_{P_{ag}}(\bullet)$ is not continuous at the extremes due to cut-in and rated-output wind speeds at the individual turbines, thus not guaranteeing a smooth Gaussian transformation. This issue can be overcome by (3), which relates the farm aggregate power and the wind speed observed at the reference MET tower of the farm. This relationship may be strictly increasing in the regime of interest. Thus, in various embodiments, principles of the present disclosure contemplate deriving $\mathcal{N}(\Gamma)$ by deriving the LC rate of wind speed $W_{m*}(t)$. The LC rate of $W_{m*}(t)$ can in turn be obtained by transforming it to a standard Gaussian random variable $W_{m*}^{N(0,1)}(t)$ and obtaining its LC rate using standard auto-regression analysis. In various embodiments, the LC rate of $W_{m*}(t)$ may be uniquely determined by the LC rate of $W_{m*}^{N(0,1)}(t)$ due to the strictly increasing property of the Gaussian transformation, as disclosed herein below.

In an exemplary embodiment, the Gaussian transformation of the wind speed at the reference MET tower, $W_{m*}(t)$, is first performed as below:

$$W_{m*}^{N(0,1)}(t) = F_{N(0,1)}^{-1}(F_{W_{m*}}(W_{m*}(t))) \quad (7)$$

where $F_{W_{m*}}(\bullet)$ is the Weibull CDF fitted to $W_{m*}(t)$ as demonstrated above. A first order auto-regressive (AR) model may be now fitted to the Gaussian transformed wind random process $W_{m*}^{N(0,1)}(t)$:

$$W_{m*}^{N(0,1)}(t) = \phi W_{m*}^{N(0,1)}(t-1) + \epsilon(t) \quad (8)$$

where the residue is modeled as $\epsilon(t) \sim N(0, \sigma_\epsilon^2)$. Note that the spacing between the time instants t and t−1 is independent of the time resolution of the Markov chain. Instead, in certain embodiments this spacing is dictated purely by the rate at which wind data is sampled. In an exemplary embodiment, wind data may be sampled every 1 minute, every 5 minutes, every 10 minutes, and/or every 30 minutes; however, any suitable sampling rate may be used. The parameters of the preceding AR(1) model—($\phi$; $\sigma_\epsilon^2$)—can be solved using standard Yule-Walker equations:

$$\phi = \frac{\gamma_1}{\gamma_0} \quad (9)$$

$$\sigma_\epsilon^2 = \gamma_0 - \gamma_1 \phi$$

where $$\gamma_0 = E_{emp}[W_{m*}^{N(0,1)}(t)]^2 \quad (10)$$
$$\gamma_1 = E_{emp}[W_{m*}^{N(0,1)}(t)W_{m*}^{N(0,1)}(t-1)]$$

with $E_{emp}$ denoting the empirical average.

For level $\Gamma$, the LC rate $\mathcal{N}_{W_{m*}^{N(0,1)}}$ of the random process $W_{m*}^{N(0,1)}(t)$ (hereafter denoted simply by W(t)), may be written as $$\mathcal{N}_{W_{m*}^{N(0,1)}}(\Gamma) = \int_{W=-\infty}^{\Gamma} \text{Prob}(W(t) > \Gamma | W(t-1) = w) f_{N(0,1)}(w) dw \quad (11)$$

where $f_{N(0,1)}(\bullet)$ denotes the standard normal probability density function. Using the AR(1) model fitted to W(t) in (8), $$\text{Prob}(W(t) > \Gamma | W(t-1) = w) = \quad (12)$$
$$\text{Prob}(\epsilon(t) > \Gamma - \phi w) = 1 - F_{N(0,1)}\left(\frac{\Gamma - \phi w}{\sigma_\epsilon}\right)$$

where $F_{N(0,1)}(\bullet)$ is the standard normal CDF. Applying (12) in (11), the LC rate of the Gaussian wind speed process is obtained. The LC rate of the original wind speed process at the reference MET tower, $W_{m*}(t)$, can now be obtained as follows:

$$\mathcal{N}_{W_{m*}}(\Gamma) = \mathcal{N}_{W_{m*}^{N(0,1)}}(F_{N(0,1)}^{-1}(F_{W_{m*}}(\Gamma))) \quad (13)$$

In accordance with an exemplary embodiment, the relationship between $P_{ag}(t)$ and $W_{m*}(t)$ from (3), where $U_m(\bullet)$ is the power curve of the turbines of class $C_m$ and $J_m(\bullet)$, is the function relating the wind speed at MET tower $H_m$ (i.e., $W_m(t)$) to the wind speed at the reference MET tower (i.e., $W_{m*}(t)$). Between the cut-in and the rated output wind speeds, the power curves are strictly increasing. Thus, $U_m(\bullet)$ is strictly increasing between the corresponding cut-in and rated-output wind speeds. In various embodiments, $J_m(\bullet)$ may be a monotonic (not necessarily strictly increasing function). In an exemplary embodiment utilizing exemplary data, it may be shown that $W_2 = J_2(W_1) = \beta^*_2 W_1$ with $\beta^*_2 > 0$ is a good fit. Thus, based on these properties, it can be seen that there exists farm level cut-in and rated-output wind speeds such that $G_{pw}(\bullet)$ is a strictly increasing function between these wind speeds. Coming back to the farm aggregate power, $P_{ag}(t)$, it can be seen that its LC rate $\mathcal{N}(\Gamma)$ can be uniquely determined by the LC rate of wind speed $W_{m*}(t)$ for any $\Gamma \in (0, P_{ag}^{max})$ that correspond to the farm level cut-in and rated-output wind speeds. Therefore, in various embodiments $$\mathcal{N}(\Gamma) = \mathcal{N}_{W_{m*}}(G_{pw}^{-1}(\Gamma)), \forall \Gamma \in (0, P_{ag}^{max}) \quad (14)$$

This may characterize the LC rate, $\mathcal{N}(\Gamma)$, of the farm aggregate wind generation $P_{ag}(t)$.

Finite State Markov Chain Model for Wind Generation Forecast: a Spatio-Temporal Analysis Approach In various embodiments, the statistical distribution and temporal dynamics of $P_{ag}(t)$ using a Markov chain may be captured with the following characteristics:

The Markov chain may be defined on a discrete-time axis and in a finite state space. Let $\mathcal{N}$ denote the state space of the Markov chain, with $N_s$ denoting the size of the state space. Specifically, state $S_k = [\Gamma_k, \Gamma_k, \Gamma_{k+1}]$, $k \in \{1, \ldots, N_s\}$, with extreme values given by $\Gamma_1=0$ and $\Gamma_{N_s+1}=P_{ag}^{max}$, the maximum value of farm aggregate wind generation.

The Markov chain may be of an order of 1. Thus, S[n] denoting the Markov state of the process $P_{ag}(t)$ in 10-min slot n, the Markov chain must satisfy Prob(S[n]=s[n]|S[n−1]=s[n−1], S[n−2]=s[n−2], ... )=Prob(S[n]=s[n]|S[n−1]=s[n−1]), for any state realization s[n−1], s[n−2], ... $\mathcal{N}$.

In various exemplary embodiments, these characteristics may be imposed to make the Markov chain forecast model amenable for practical application. The second characteristic may be adopted so that a forecast may be made based on the most recent wind generation only, but this may be generalized easily by using high-order Markov chains. Note that $P_{ag}^{max}$ is well defined ($P_{ag}^{max}$=300.5 MW for the exemplary wind farm considered), since the power curve of any turbine has a rated output wind speed and an associated maximum power output rating.

Markov Chain State Space Design

According to various embodiments, after characterizing the distribution and the temporal dynamics of the farm aggregate power, $P_{ag}(t)$, a suitable approach, for example an approach developed in the context of designing a Markov model for Rayleigh fading wireless channels may be closely followed to optimize the state space of the Markov chain. For example, the quantity $\tau_k$ may be defined as the average duration of time the process $P_{ag}(t)$ stays in state $S_k$, i.e., $\tau_k$ is the ratio of the total duration of time $P_{ag}(t)$ falls in the range [$\Gamma_k, \Gamma_{k+1}$) and the number of such segments, both measured over a long period of time. Thus, by definition, $$\tau_k = \frac{F_{P_{ag}}(\Gamma_{k+1}) - F_{P_{ag}}(\Gamma_k)}{\mathcal{N}(\Gamma_{k+1}) + \mathcal{N}(\Gamma_k)} \quad (15)$$

where $F_{P_{ag}}(\bullet)$ denotes the CDF of $P_{ag}(t)$ characterized hereinabove. For a given state space $\mathcal{N}$, the following interpretations of $\tau_k$ are contemplated by principles of the present disclosure.

For a state $S_k$, a smaller value of $\Gamma_k$ may indicate that the random process $P_{ag}(t)$ is more likely to switch across states within a time slot, for example a 10-min time slot, and hence the random process may not be sufficiently captured within a state within a time slot. A low value of $\tau_k$ and associated in-slot state crossovers may also indicate that across slots, non-adjacent transitions are more likely to happen. From these observations, in order to obtain a Markov chain that sufficiently captures the transitional characteristics of the random process $P_{ag}(t)$, an approach, according to various embodiments, may be to introduce a constant $\tau$ and find the $N_s-1$ variables $\{\Gamma_2, \Gamma_3, \ldots, \Gamma_{N_s}\}$ by solving (15) with $\tau_k=\tau$, $\forall k\in\{1, \ldots, N_s\}$. Once the state space is designed, the transition probability may be calculated. As used herein Q may denote the transition matrix, then $$[Q]_{i,j} = \frac{n_{ij}}{\sum_{k=1}^{N_s} n_{ik}} \quad (16)$$

where $[\bullet]_{i,j}$ denote the entry at row i and column j of a matrix, and $n_{ij}$ is the number of transition from $S_i$ to $S_j$ encountered in the data.

In various embodiments, the non-uniform state space, $\mathcal{N}_{non-unif}$ may be plotted together with the values of $\tau_k$ for all the states, obtained based on the above approach with $\tau=2$. For comparison, the uniform state space with the same number of states, $\mathcal{N}_{unif}$, and the corresponding values of $\tau_k$ are plotted in the same figure. As expected from the preceding discussion, $\mathcal{N}_{non-unif}$ may be sporadic in the mid-range and dense around the extremes. Using the exemplary data, the corresponding value of $\tau_k$ is reasonably equalized around 2. In contrast, for the uniform state space $\mathcal{N}_{unif}$, $\tau_k$ shows higher variation with most of the values around 1, which means higher likelihood of in-slot state transitions in the mid to high range of states, while the lower states, with higher $\tau_k$, are stable beyond what is may be required. This may be confirmed by other plots of the empirical transition probabilities between the states across the 10-min slots is plotted for each choice of state space $\mathcal{N}_{non-unif}$ and $\mathcal{N}_{unif}$. Using the exemplary data, the transitions are mostly confined to adjacent states for state space $\mathcal{N}_{non-unif}$, whereas for $\mathcal{N}_{unif}$ the transitions are relatively more spread out to states beyond the adjacent states.

In various exemplary embodiments, given the transition matrix of the Markov chain Q and the most recent aggregate wind generation at time $t-t_1$, a point-forecast of $P_{ag}(t)$ using the Markov chain may be given by:

$$\hat{P}_{ag}(t)=\Sigma_{k=1}^{N_s} p_k [Q^{t_1}]_{i_0,k} \quad (17)$$

where $i_0$ denotes the state of aggregate wind generation at time $t-t_1$, and $p_k=(\Gamma_{k+1}+\Gamma_k)/2$ is the representative generation level of state $S_k$. For comparison, wind-speed-based approaches may be tested, in which the forecast of aggregate wind generation may be modeled by $$\hat{P}_{ag}(t)=\Sigma_{m=1}^{M} N_m U_m(\hat{W}_m(t)) \quad (18)$$

where $\hat{W}_m(t)$ is the forecasted wind speed at MET $H_m$. For example, two existing forecast models of wind speed are illustrated below, but other models are considered by principles of the present disclosure:

Persistent prediction of wind speed (PPW): $\hat{W}_m(t)=W_m(t-1)$; and

Linear prediction of wind speed (LPW): $\hat{W}_m(t)=\Sigma_{l=1}^{L} a_l W_m(t-l)$, in which the prediction coefficients $a_l$ may be obtained by fitting an L-order AR model to the wind speed data available at time $t-t_l$.

According to various embodiments, historical data (e.g., exemplary data of January 2009) may be used for spatio-temporal analysis and Markov chain design, and other corresponding exemplary data (for example, data from 2010) may be used for testing. Forecast errors may quantified using mean absolute error (MAE), i.e., $$\frac{1}{N_t}\sum_t |P_{ag}(t) - \hat{P}_{ag}(t)|$$

and mean absolute percentage error (MAPE), i.e., $$\frac{1}{N_t}\sum_t \left|\frac{P_{ag}(t) - \hat{P}_{ag}(t)}{P_{ag}(t)}\right|,$$

where $N_t$ denotes the number of test data points.

It is observed from Table I (below) that Markov chain models can lead to significant improvement in forecast accuracy (note that the rated capacity of the exemplary wind farm $P_{ag}^{max}$=300.5 WM). It is also observed from that wind-speed-based forecast can lead to artificial "spikes" that could have severe impact on the reliability of power systems if the forecast is used for economic dispatch. Another key observation from Table I is that smaller values of τ can lead to higher forecast accuracy of Markov chain models. This improvement may be achieved at the cost of higher complexity of Markov chain models (in terms of the number of states). Thus, in various embodiments, there may be a trade-off between the forecast accuracy and the complexity of Markov chain models.

TABLE I

FORECAST PERFORMANCE

|  | Error | PPW | LPW (L = 12) | MC (τ = 2) | MC (τ = 1) |
|---|---|---|---|---|---|
| 10-min forecast | MAE | 56.5 MW | 43.3 MW | 14.9 MW | 11.3 MW |
|  | MAPE | 38.8% | 28.1% | 14.5% | 10.5% |
| 1-hour forecast | MAE | 60.9 MW | 57.1 MW | 18.4 MW | 13.5 MW |
|  | MAPE | 47.1% | 43.9% | 18.5% | 12.5% |

Figure 6:
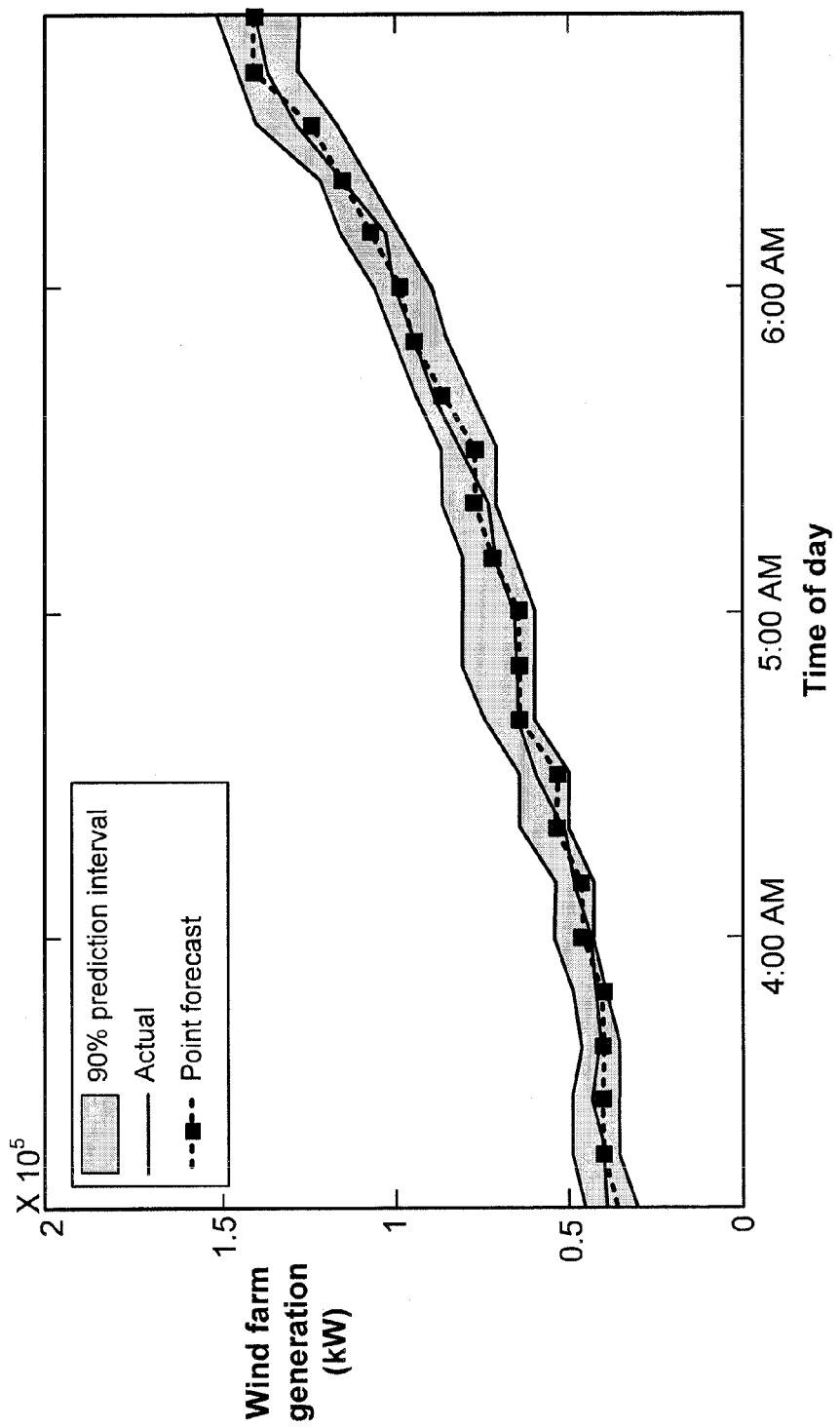
FIG. 6 illustrates data for a 10 minute distributional forecast from an exemplary wind farm in accordance with an exemplary embodiment.
Figure 7:
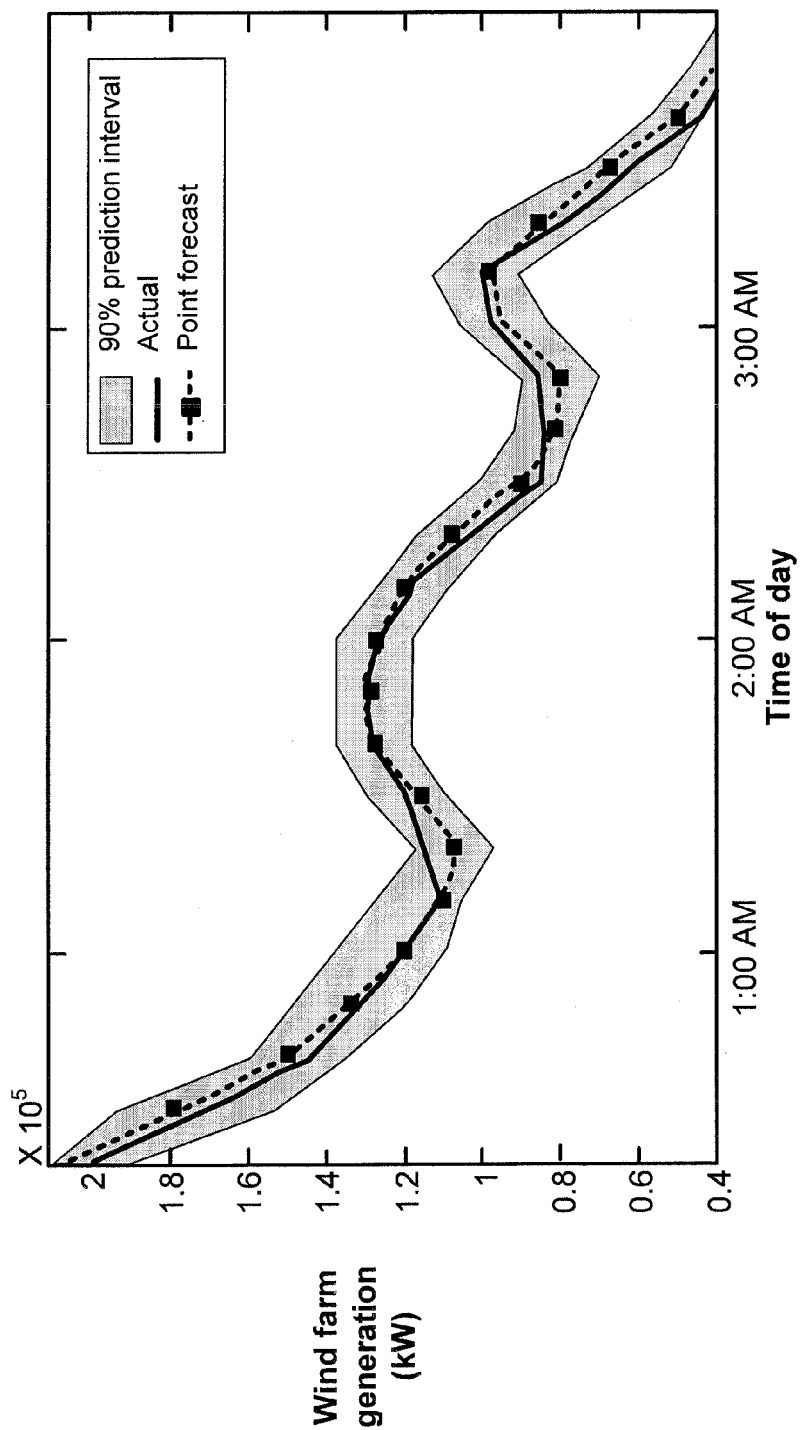
FIG. 7 illustrates data for a 10 minute distributional forecast from an exemplary wind farm in accordance with an exemplary embodiment.
Figure 8:
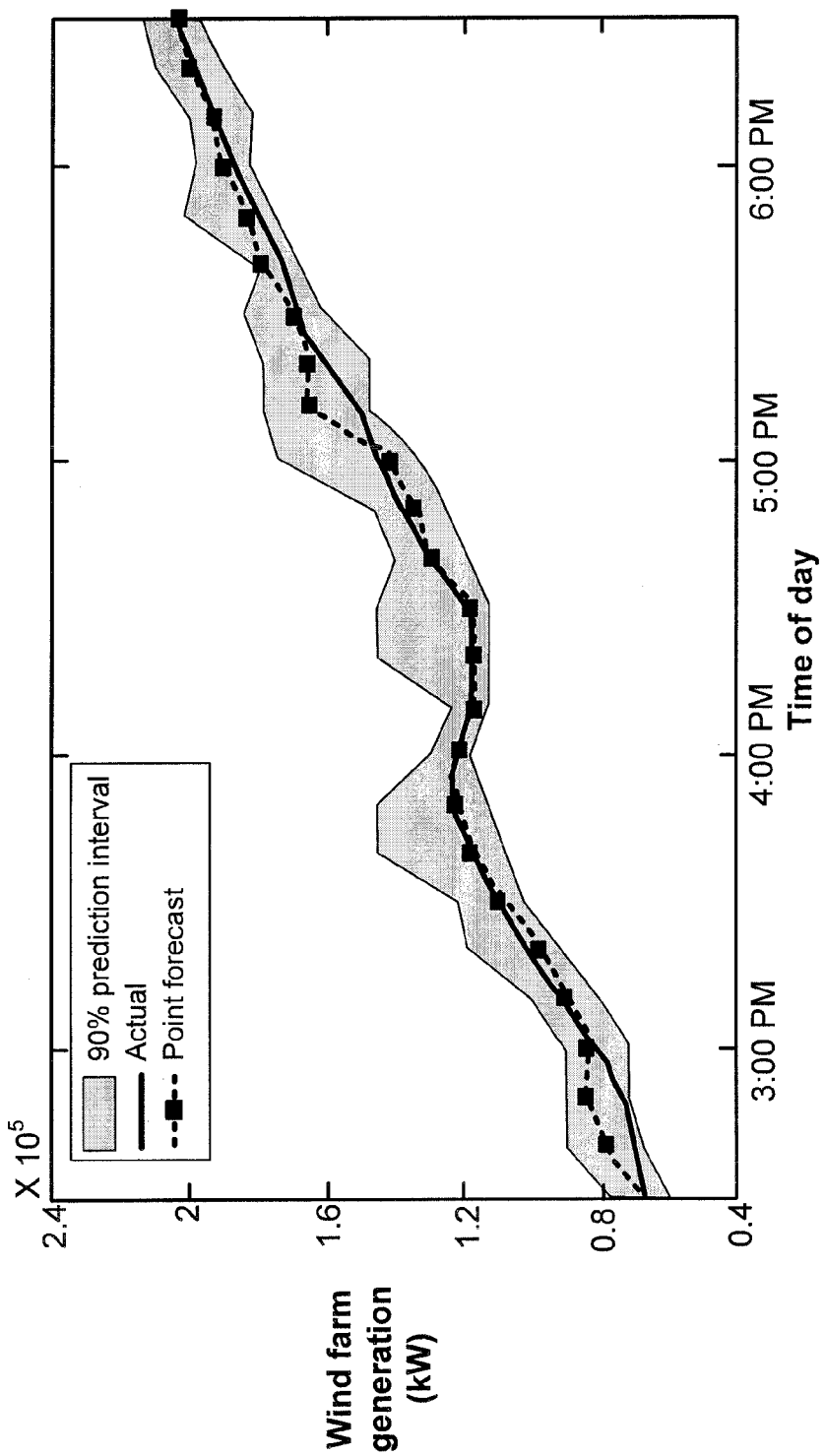
FIG. 8 illustrates data for a 10 minute distributional forecast from an exemplary wind farm in accordance with an exemplary embodiment.

For example, with reference to FIGS. 6-8, three separate exemplary episodes of prediction intervals are plotted to exemplify the disclosed Markov-chain-based distributional forecasts. In FIGS. 6-8, three representative time periods are chosen. In FIG. 6, the 3-6 PM epoch of January $8^{th}$ is illustrated. In FIG. 7, the 0-3 AM epoch of January $23^{rd}$ is illustrated. In FIG. 8, the 3-6 PM epoch of April $16^{th}$ is illustrated. The data in FIG. 6 was chosen because January and the 3-6 PM epoch have the highest median CRPS value (i.e., least accurate forecasts), and the CRPS value of January 8th is mostly close to the corresponding median value. Regarding the data illustrated in FIG. 7, January 23rd is an extreme day that had the highest average ramp rate among all of the days in January, and the 0-3 AM epoch experienced a large down-ramp from 75% to 25% of the rated capacity. Regarding the data illustrated in FIG. 8, this period was chosen because to similar reasons as the first period, except that April is the month that has the least CRPS values.

FIGS. 6-8 also illustrate the 90% prediction intervals obtained by the developed Markov chain-based distributional forecasts. As can be seen in FIGS. 6-8, for all three representative periods, the realized wind farm generation reasonably lies in the 90% prediction intervals.

Figure 9:
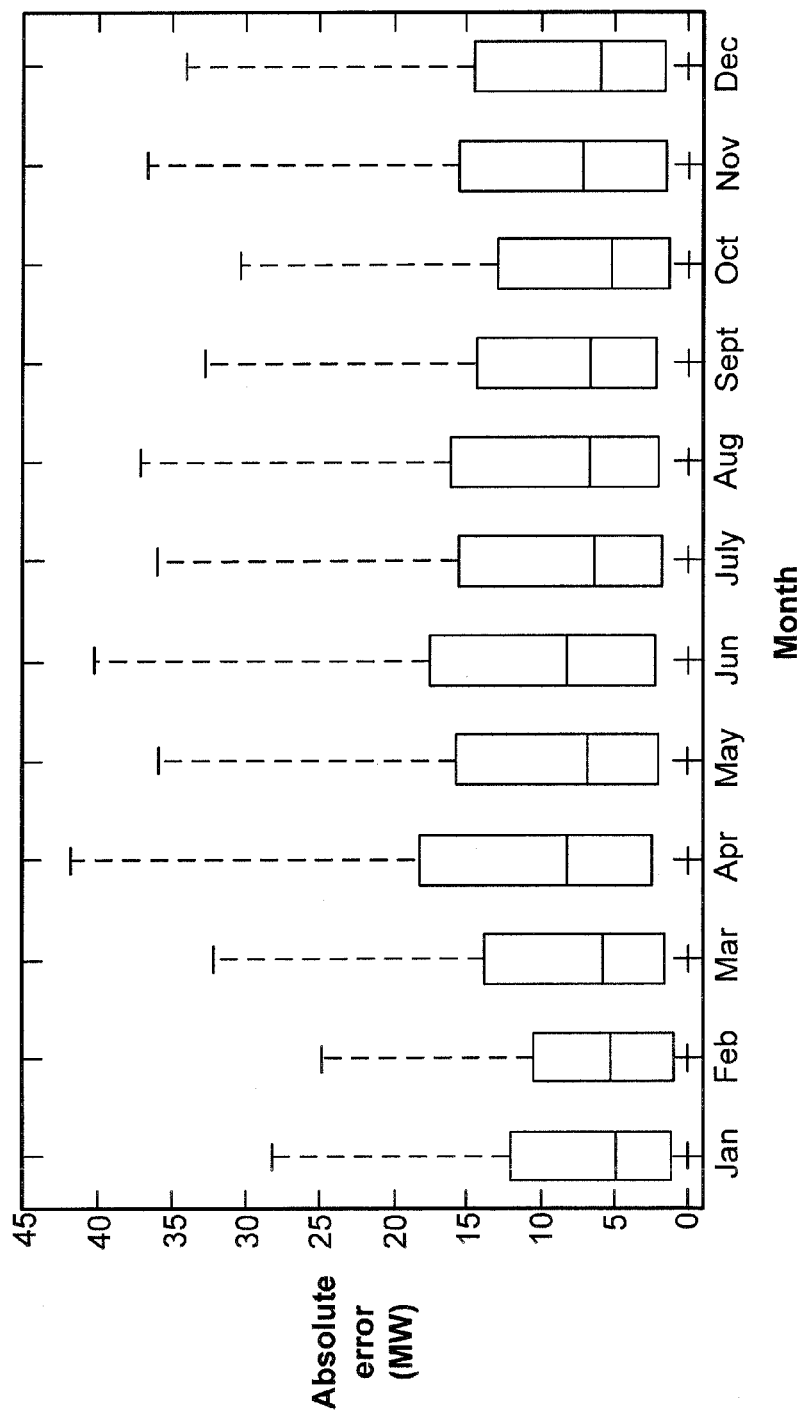
FIG. 9 illustrates absolute error for each month in a year from distributional forecasts from an exemplary wind farm in accordance with an exemplary embodiment.
Figure 10:
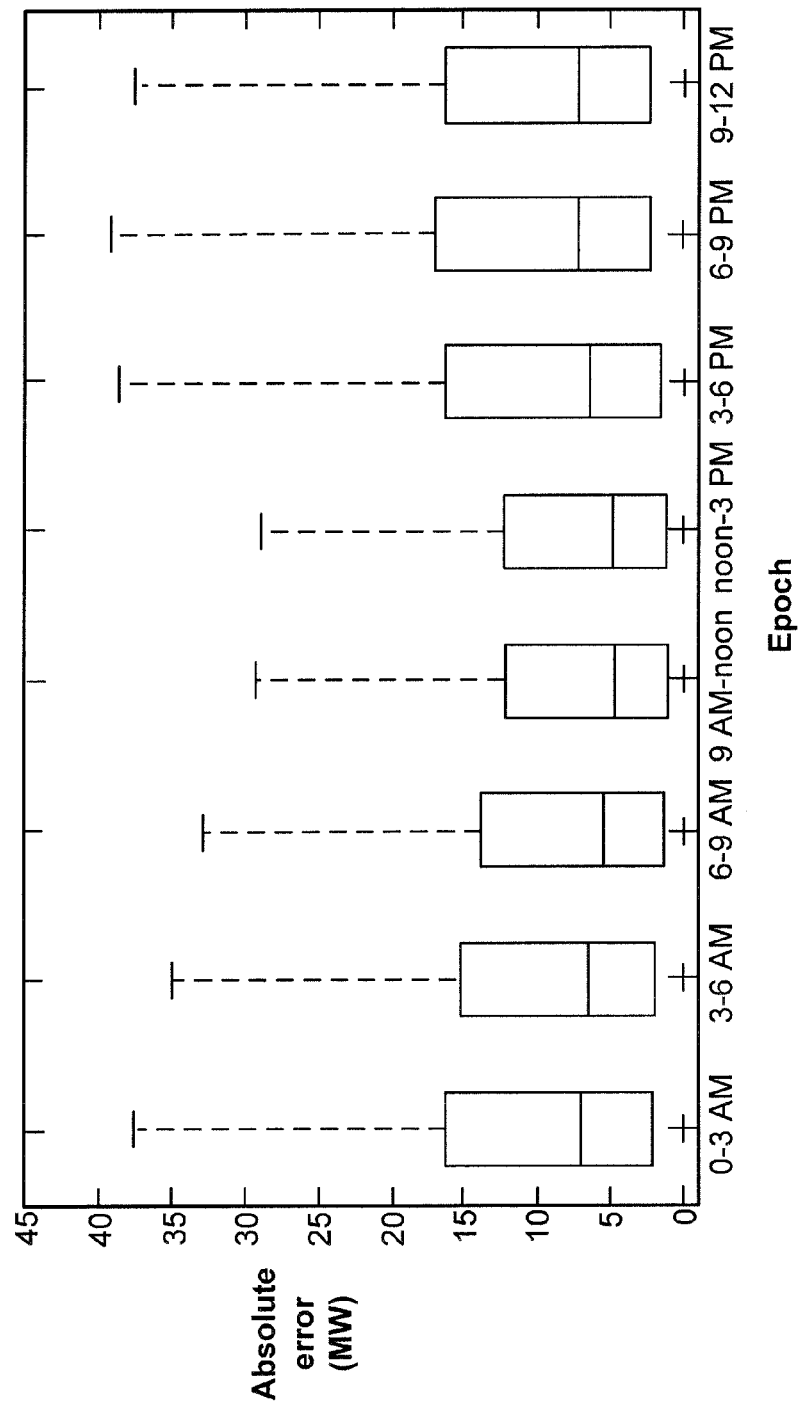
FIG. 10 illustrates absolute error for 8 epochs from distributional forecasts from an exemplary wind farm in accordance with an exemplary embodiment for an entire year.

With reference to FIGS. 9 and 10, FIGS. 9 and 10 illustrate statistics regarding the absolute error of the Markov chain-based point forecasts over different months and different epochs respectively. As can be seen in FIGS. 9 and 10, the developed Markov chain-based point forecasting methods perform consistently across the entire year.

From the results presented above, it can be seen that the disclosed distributional forecast approach outperforms high-order AR-based distributional forecasts with Gaussian and log-normal distributions. Without being limited to any theory, principles of the present disclosure contemplate that the spatio-temporal analysis extracts the rich statistical information of wind farm generation and the Markov chain models may provide more accurate distributional forecasts than prior approaches, for example AR models with assumed Gaussian and lognormal distributions.

In various exemplary embodiments, a Markov-chain-based framework is developed to forecast the aggregate wind generation from a wind farm. The developed model may take into account both the spatial and temporal dynamics of aggregate wind generation of the farm. In an exemplary embodiment, using extensive data from a wind farm in the western USA, spatio-temporal analysis of the aggregate power output from the farm may be performed. For the investigated wind farm, the MST with homogeneous linear regression coefficients for parent-child turbines effectively characterizes the spatial correlation within the farm. More sophisticated regression models (e.g., exponential regression models, quadratic regression models, and/or any other type of suitable regression model) may be utilized to generalize the study by characterizing the detailed spatial dynamics of wind farms. The temporal dynamics of the aggregate wind generation may be characterized using autoregression analysis tools. Based on these spatial and temporal characterizations, a finite state Markov chain model for forecasting the aggregate wind generation may be derived in a rigorous optimization framework. The forecast performance of the designed Markov chain may be evaluated via an intensive numerical study.

By utilizing a predictive model as disclosed herein, significant improvements in accuracy over wind-speed-based forecasts are observed. While the principles of this disclosure have been shown in various embodiments, many modifications of structure, arrangements, proportions, the elements, materials and components, used in practice, which are particularly adapted for a specific environment and operating requirements may be used without departing from the principles and scope of this disclosure. These and other changes or modifications are intended to be included within the scope of the present disclosure and may be expressed in the following claims.

Figure 14:
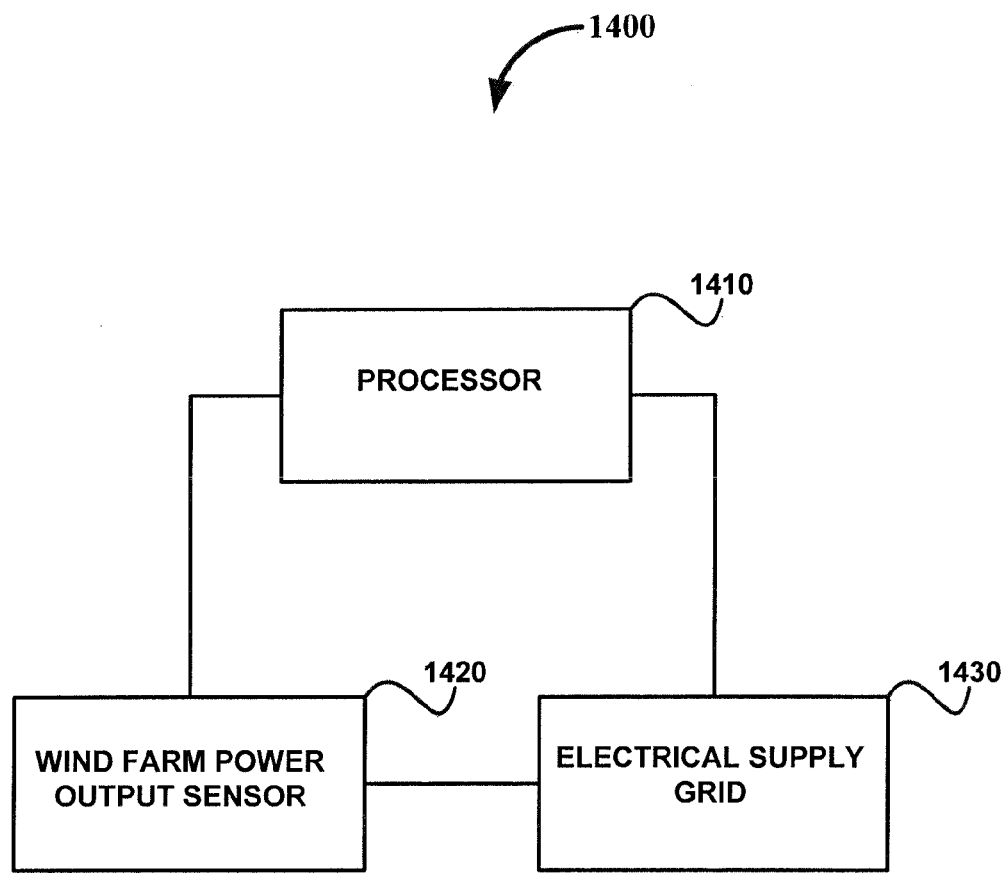
FIG. 14 illustrates a system for managing an electrical supply grid according to various embodiments.

Having discussed various methods for predicting the power output of a wind farm and managing electricity of an electrical supply grid, systems for managing electricity of an electrical supply grid are also disclosed. With reference to FIG. 14 and according to various embodiments, system 1400 may be used to manage electricity of an electrical supply grid. System 1400 may comprise a processor 1410, a wind farm output sensor 1420, and an electrical supply grid 1430.

According to various embodiments, system 1400 may comprise a processor configured to be in electrical communication with wind farm power output sensor 1420. In various embodiments processor 1410 may be configured to identify relationships among a plurality of turbines in the wind farm with a minimum spanning tree, calculate a power output relationship among the plurality of turbines with a minimum spanning tree, create a finite state space Markov chain forecast model for the plurality of turbines in the wind farm; predict a power output of the wind farm with the finite state space Markov chain forecast model; and determine, based on the predicted power output of the wind farm, whether at least one of a generation of electricity and a distribution of electricity should be modified.

In various embodiments, system 1400 may be in electrical communication with a meteorological tower collocated with a turbine of the wind farm. For example, in various embodiments, processor 1410 may be in electrical communication with a meteorological tower collocated with a turbine of the wind farm. In various embodiments, system 1400 may be in electrical communication with a class sensor of a turbine. For example, the class sensor may be in electrical communication with processor 1410. In various embodiments, the class sensor may be capable of signaling at least one of a turbine height, a turbine manufacturer, and a turbine model. In various embodiments, the system 1400 may further comprise a power grid sensor capable of detecting or receiving information regarding the characteristic or characteristics the electrical grid. In various embodiments, processor 1410 may be capable of altering at least one of the generation of electricity and the distribution of electricity.

The present disclosure has been described with reference to various embodiments. However, one of ordinary skill in the art appreciates that various modifications and changes can be made without departing from the scope of the present disclosure. Accordingly, the specification is to be regarded in an illustrative rather than a restrictive sense, and all such modifications are intended to be included within the scope of the present disclosure. Likewise, benefits, other advantages, and solutions to problems have been described above with regard to various embodiments. However, benefits, advantages, solutions to problems, and any element(s) that may cause any benefit, advantage, or solution to occur or become more pronounced are not to be construed as a critical, required, or essential feature or element of any or all the claims.

As used herein, the meaning of the term "non-transitory computer-readable medium" should be construed to exclude only those types of transitory computer-readable media which were found in *In re Nuiten,* 500 F.3d 1346 (Fed. Cir. 2007) to fall outside the scope of patentable subject matter under 35 U.S.C. §101, so long as and to the extent *In re Nuiten* remains binding authority in the U.S. federal courts and is not overruled by a future case or statute. Stated another way, the term "computer-readable medium" should be construed in a manner that is as broad as legally permissible.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of embodiments encompassed by this disclosure. The scope of the claimed matter in the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

Systems, methods and apparatus are provided herein. In the detailed description herein, references to "various embodiments", "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. §112(f), unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A method of managing electricity of an electrical supply grid electrically connected to a wind farm, the method comprising:
   identifying relationships among a plurality of turbines in the wind farm with a minimum spanning tree, wherein the minimum spanning tree separates the plurality of wind turbines into a plurality of classes, identifies a parent turbine for each turbine within a particular class, and guarantees that each turbine in a particular class is linked to a root turbine of that class;
   calculating a power output relationship among the plurality of turbines with the minimum spanning tree;
   creating a finite state space Markov chain forecast model for the plurality of turbines in the wind farm;
   predicting a power output of the wind farm with the finite state space Markov chain forecast model; and
   modifying at least one of a generation of electricity and a distribution of electricity based on the predicted power output of the wind farm.

2. The method according to claim 1, further comprising forming a probability distribution of aggregate power generation of the wind farm.

3. The method according to claim 1, further comprising measuring real-time wind farm electricity generation.

4. The method according to claim 3, wherein the predicting a power output of the wind farm comprises at least one of a distributional forecast and a point forecast.

5. The method according to claim 1, wherein the predicted power output of the wind farm is predicted for a period about 10 minutes into the future.

6. The method according to claim 1, wherein the predicted power output of the wind farm is a period of time about 5 minutes into the future.

7. The method according to claim 1, wherein the predicted power output of the wind farm is a period of time about one hour into the future.

8. The method according to claim 1, wherein the creation of the finite state space Markov chain forecast utilizes ramp trend information.

9. The method according to claim 1, wherein the creation of the finite state space Markov chain forecast model comprises historical data comprising at least one of a historic data of wind turbine power output and a historic data of wind speed.

10. The method according to claim 1, wherein a plurality of finite state space Markov chains are created for an epoch.

11. The method according to claim 1, wherein a plurality of finite state space Markov chains are created for each month in a year.

12. A system for managing electricity of an electrical supply grid electrically connected to a wind farm, the system comprising:

a processor configured to be in electrical communication with a wind farm power output sensor, wherein the processor is configured to:

identify relationships among a plurality of turbines in the wind farm with a minimum spanning tree, wherein the minimum spanning tree separates the plurality of wind turbines into a plurality of classes, identifies a parent turbine for each turbine within a particular class, and guarantees that each turbine in a particular class is linked to a root turbine of that class;

calculate a power output relationship among the plurality of turbines with a minimum spanning tree;

create a finite state space Markov chain forecast model for the plurality of turbines in the wind farm;

predict a power output of the wind farm with the finite state space Markov chain forecast model; and determine, based on the predicted power output of the wind farm, whether at least one of a generation of electricity and a distribution of electricity should be modified.

13. The system according to claim 12, wherein the system is in electrical communication with a meteorological tower collocated with a turbine of the wind farm.

14. The system according to claim 12, wherein the system is in electrical communication with a class sensor.

15. The system according to claim 14, wherein the class sensor signals least one of a turbine height, a turbine manufacturer, and a turbine model.

16. The system according to claim 12, further comprising a power grid sensor that detects a current electrical power of the electrical grid.

* * * * *